US012776333B2

(12) United States Patent
Travaglini et al.

(10) Patent No.: US 12,776,333 B2
(45) Date of Patent: Oct. 27, 2026

(54) APPARATUS AND METHOD FOR ADAPTIVE BACKGROUND AUDIO GAIN SMOOTHING

(71) Applicant: Fraunhofer-Gesellschaft zur Förderung der angewandten Forschung e.V., Munich (DE)

(72) Inventors: Alessandro Travaglini, Erlangen (DE); Lukas Lamprecht, Erlangen (DE); Jouni Paulus, Erlangen (DE); Christian Uhle, Erlangen (DE); Christian Simon, Erlangen (DE); Andreas Turnwald, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 358 days.

(21) Appl. No.: 18/463,164

(22) Filed: Sep. 7, 2023

(65) Prior Publication Data

US 2023/0419982 A1 Dec. 28, 2023

Related U.S. Application Data

(63) Continuation of application No. PCT/EP2022/055013, filed on Feb. 28, 2022.

(30) Foreign Application Priority Data

Mar. 8, 2021 (EP) .................................... 21161320

(51) Int. Cl.
*G10L 21/0324* (2013.01)
*G10L 21/02* (2013.01)

(52) U.S. Cl.
CPC .......... *G10L 21/0324* (2013.01); *G10L 21/02* (2013.01)

(58) Field of Classification Search
CPC . G10L 21/0324; G10L 21/02; G10L 21/0316; G10L 25/78
See application file for complete search history.

(56) References Cited

U.S. PATENT DOCUMENTS

| | | |
|---|---|---|
| 2,113,834 A | 4/1938 | Groves |
| 4,811,404 A | 3/1989 | Vilmur et al. |

(Continued)

FOREIGN PATENT DOCUMENTS

| | | |
|---|---|---|
| CN | 101689373 A | 3/2010 |
| CN | 110036440 A | 7/2019 |

(Continued)

OTHER PUBLICATIONS

J.-M. Jot, B. Smith and J. Thompson, "Dialog Control and Enhancement in Object-Based Audio Systems," in AES 143rd Convention, New York, 2015.

(Continued)

*Primary Examiner* — Daniel C Washburn
*Assistant Examiner* — Penny L Caudle
(74) *Attorney, Agent, or Firm* — Haynes and Boone, LLP; Robert P. Ziemian

(57) ABSTRACT

An apparatus for providing a sequence of output gains, wherein the sequence of output gains is suitable for attenuating a background signal of an audio signal is provided. The apparatus comprises a signal characteristics provider configured to receive or to determine signal characteristics information on one or more characteristics of the audio signal, wherein the signal characteristics information depends on the background signal, wherein the signal characteristics information comprises a sequence of input gains which depends on the background signal and on a foreground signal of the audio signal. Moreover, the apparatus comprises a gain sequence generator configured to deter- (Continued)

mine the sequence of output gains depending on the sequence of input gains. To determine the sequence of outputs gains, to modify a current gain value of a current gain of the sequence of output gains to a target gain value, the gain sequence generator is configured to determine a plurality of succeeding gains, which succeed the current gain in the sequence of output gains, by gradually changing the current gain value according to a modification rule during a transition period to the target gain value. The modification rule depends on the signal characteristics information; and/or the gain sequence generator is configured to determine the target gain value depending on a further one of the one or more signal characteristics in addition to the sequence of input gains.

27 Claims, 8 Drawing Sheets

(56) References Cited

U.S. PATENT DOCUMENTS

| | | | | |
|---|---|---|---|---|
| 5,402,500 | A | 3/1995 | Sims, Jr. | |
| 8,428,758 | B2 | 4/2013 | Naik et al. | |
| 9,300,268 | B2 | 3/2016 | Chen et al. | |
| 9,324,337 | B2 | 4/2016 | Brown | |
| 9,536,541 | B2 | 1/2017 | Chen et al. | |
| 10,600,432 | B1 * | 3/2020 | Chu | G10L 21/0316 |
| 2006/0222194 | A1 | 10/2006 | Bramslow et al. | |
| 2009/0010453 | A1 | 1/2009 | Zurek et al. | |
| 2010/0211199 | A1 | 8/2010 | Naik et al. | |
| 2011/0119061 | A1 | 5/2011 | Brown | |
| 2011/0313763 | A1 | 12/2011 | Amada | |
| 2015/0032446 | A1 * | 1/2015 | Dickins | G10L 25/78 704/233 |
| 2015/0110294 | A1 * | 4/2015 | Chen | H03G 7/002 381/106 |
| 2016/0203830 | A1 | 7/2016 | Chen et al. | |
| 2017/0011753 | A1 | 1/2017 | Herbig et al. | |
| 2017/0092290 | A1 * | 3/2017 | Barkale | G11B 27/038 |
| 2017/0127212 | A1 | 5/2017 | Jot et al. | |
| 2019/0149929 | A1 | 5/2019 | Fitz et al. | |
| 2019/0267022 | A1 | 8/2019 | Lombard et al. | |
| 2020/0220511 | A1 | 7/2020 | Shaya et al. | |

FOREIGN PATENT DOCUMENTS

| | | | |
|---|---|---|---|
| DE | 102019203786 | A1 | 2/2020 |
| EP | 0814636 | A1 | 12/1997 |
| EP | 2009786 | | 12/2008 |
| EP | 2009786 | A1 | 12/2008 |
| JP | H08249303 | A | 9/1996 |
| WO | WO9953612 | A1 | 10/1999 |

OTHER PUBLICATIONS

M. Torcoli, A. Freke-Morin, J. Paulus, C. Simon and B. Shirley, “Background Ducking to Produce Esthetically Pleasing Audio for TV with Clear Speech,” in Proceedings of the 146th AES Convention, Dublin, Ireland, 2019.

EBU, R128—Loudness normalisation and permitted maximum level of audio signals, 2014.

International Telecommunication Union, “ITU-R BS.1770-3: Algorithms to measure audio programme loudness and true-peak audio level,” Geneva, 2015.

Anonymous, “Noise gate”, Wikipedia, Jan. 26, 2021, pp. 1-5, https://en.wikipedia.org/w/index.php?title=Noise_gate&oldid=1002779157, XP055924538.

M. Olvera et al, “Foreground-Background Ambient Sound Scene Separation”, arXiv.org, 20200727 Cornell University Library, 201 Olin Library Cornell University Ithaca, NY 14853, XP081711162.

International Search Report dated May 16, 2022 relating to application PCT/EP2022/063211.

Written Opinion dated May 16, 2022 relating to application PCT/EP2022/063211.

Office Action dated Dec. 4, 2024 in the parallel Indian patent application No. 202337060186 (6 pages).

International Search Report and Written Opinion dated Sep. 15, 2022 issued in PCT App. No. PCT/EP2022/055013 12 pages).

Anonymous: “Noise gate—Wikipedia”, Wikipedia, Jan. 26, 2021 (Jan. 26, 2021), pp. 1-5, XP055924538, Online Retrieved from the Internet: URL:https://en.wikipedia.org/w/index.php?title=Noise_gate&oldid=1002779157.

Office Action dated May 14, 2026 issued in related Chinese patent app. no. 202280032942.0 (23 pages).

* cited by examiner

APPARATUS AND METHOD FOR ADAPTIVE BACKGROUND AUDIO GAIN SMOOTHING

CROSS-REFERENCES TO RELATED APPLICATIONS

This application is a continuation of copending International Application No. PCT/EP2022/055013, filed Feb. 28, 2022, which is incorporated herein by reference in its entirety, and additionally claims priority from European Application No. EP 21 161 320.3, filed Mar. 8, 2021, which is incorporated herein by reference in its entirety.

BACKGROUND OF THE INVENTION

The present invention relates to an apparatus and a method for adaptive background audio gain smoothing, e.g., to an apparatus and a method for smoothing of gain signals generated for automatic ducking of background content in real-time scenarios.

In case of automatic mixing of two or more different audio signals, where one signal (foreground) consists of speech (with or without background noise) and the second signal (or group of signals) consists of background sound (comprising e.g., music, general sounds like ambience, noise, foleys, sound effects, but potentially also speech), the audio level of the latter signal (background) might need to be attenuated to ensure that speech comprised in the foreground signal results still intelligible once mixed with the background signal in the output program.

In order to accomplish an esthetically pleasing mixing result, the time-varying attenuation of the background signal should be as small, smooth and unobtrusive as possible in order to not interrupt the flow of content. It should still be as high as the listening environment, playback system, or listening capability of the recipients require. Those two opposite requirements are difficult to accomplish in a non-adaptive system. Ultimately, the esthetical quality of the automatically generated mixed program highly depends on the ability of the mixing method to identify and analyze the relevant characteristics of the input signals, e.g., presence or absence of speech content, component signal levels, background signal content class (music, noise, etc). Furthermore, low-delay (or real-time) applications require that the attenuation is computed and adapted to the input signals with a small or non-existent look-ahead (information from the future samples) and with low processing delay (in the envisioned application, the maximum total produced delay is in the order of a few hundred milliseconds). For these reasons, existing technical solutions are esthetically not often pleasing in a low-delay application and are therefore rarely used.

The esthetic pleasantness of an automixing technology is significantly dependent on the behavior of the attack and release phases which occur at the beginning and at the end of every ducking process. In order to achieve a pleasant result, attack and release phases need to be perceptually smooth. However, they also need to be able to react quickly on significant signal changes. More concretely:

Slow time constants provide a smooth behavior for stationary signals.

Delayed release of the background attenuation in case of a subsequent ducking event occurring within a time range of up to few seconds contribute to a more pleasant listening experience.

When the background signal level increases suddenly and significantly, an attack phase needs to react quickly in order to guarantee foreground audibility.

In some cases, the background signal may, e.g., comprise speech which is supposed to be presented at foreground level (e.g., interviews in original language in documentaries). In these circumstances it is therefore needed that the ducking is released quickly, as far as no further foreground signal is concurrently occurring.

Those two opposite needs, when implemented in real-time tools using fast time-constants, can easily lead to annoying behavior of the ducking gain which results in unpleasant rapid fluctuation of the background level (aka "pumping").

Offline ducking benefits of file-based processing which allows a significant large look-ahead signal detection which prevents from this unpleasant and undesired ducking gain noise. In addition, users are aware of the source content context and can consequently set the algorithm to produce a program output with the expected aesthetic quality and sonic pleasantness. This includes the ability to tune Look-ahead, Attack and Release depending on the content being processed. Furthermore, users can verify the generated mix and, if not satisfied with it, apply changes to the algorithm setting to achieve a different result.

Due to the "live" nature of real-time processing, the algorithm needs to include methods for adapting its behavior according to the characteristics of the source content within the constraints of small look-ahead size.

Two of the semantic characteristics that source background content most importantly show are sudden loudness variations (e.g., loud music intros), and speech presence (during or after ducking).

The real-time ducking processor needs to be capable of detecting and reacting to those events quickly.

In the state of the art, three computational background attenuation methods are known.

As a first background attenuation method, static attenuation exists. Once the foreground signal's (FGO) level, e.g., speech, exceeds a defined threshold, the background signal (BGO) gets attenuated by a predefined level. The BGO level is not considered in this method, so the BGO is attenuated even when its level is low, and attenuation would not be necessary. The unnecessary attenuation damages the esthetic quality of the modified background signal, and in the worst case causes gaps due to excessive attenuation.

As another background attenuation method, "Ducking" is employed in the art. The BGO is attenuated by means of a control amplifier ("compressor"), whose control value is derived from the foreground signal ("sidechain ducking"). Even though the level of the FGO signal is considered, the operation acts in the wrong direction, i.e., the higher the FGO signal level is, the more the BGO is attenuated. Furthermore, the method still does not consider the BGO level, leading into attenuating the BGO even if it is low in level and attenuation is not necessary.

A further background attenuation concept relates to an "Automixer". Different manufacturers use different algorithms, which are exclusively concerned with the mixing of equivalent FGO signals (e.g., several voices in a talk show). The levels of the individual FGO signals are manually adjusted to the same perceived loudness or level before the automixer lowers the inactive signals. Background signals are not included in this mixing concept.

Another approach has been outlined in an earlier publication already in the year 1938 (see [3]) stating "the dialogue and sound effects volume levels were generally controlled by an operator who manually adjusted the mixing panel in an effort to keep the same volume level ratio between the background sound and the dialogue." The publication describes a non-computational method of mixing as it was already practiced by sound engineers and is known as "volume fader riding". The level of the background signal is lowered manually, reflecting the loudness relation between foreground and background: the background is attenuated enough to make sure the foreground signal is audible enough and esthetically pleasing. However, the same publication states the problem that it was impossible to constantly maintain an even balance between the sound effects and the dialogue due to the fact that the volume could not be controlled fast enough by hand.

Moreover, in the conventional technology, Jot et al. (see [1]) describe a method addressing improving dialogue intelligibility in the decoder and playback device based on side information attached to the audio stream and the personalization settings of the user. The work shares the idea of dialogue to background relative loudness (they use the term "dialog salience"). Their work uses a global "dialog salience personalization" adjusting the ratio of the integrated loudness (i.e., the average loudness over the entire program) of the dialogue and background to a specified level. This is an overall level change, which improves the audibility of the dialogue, but also attenuates the background even when the dialogue is not active. In addition to this, they propose a short-term "Dialog Protection" algorithm operating with short-term (5-20 ms) loudness and amplifying the dialogue track to match the target "short-term dialog salience", i.e., short-term loudness difference. See also US 2017/0127212 A1 focusing on the "long-term dialog salience".

U.S. Pat. No. 9,536,541 outlines the method as determining an amount of "slave track" attenuation based on the loudness levels of "slave" (here, background) and "master" (here, dialogue) tracks and the "minimum loudness separation". There, it is proposed to address the esthetically problematic aspects of temporal variations by computing the momentary loudness difference between the master and slave signals and using the worst-case value within longer frames as the value to define the signal modification, see also U.S. Pat. No. 9,300,268

U.S. Pat. No. 8,428,758 is intended for adaptively ducking a media file playing back during a concurrent playback of another media file based on, e.g., their respective loudness values, but the ducking, or attenuation, is determined for the entire duration of concurrent playback at once and is not time-varying.

U.S. Pat. No. 9,324,337 describes a method which includes attenuating the "non-speech channels" base on the level of the "speech channels". However, the method suffers from the main drawback mentioned also earlier, that the attenuation increases as the speech level increases, i.e., the wrong way around.

SUMMARY

An embodiment may have an apparatus for providing a sequence of output gains, wherein the sequence of output gains is suitable for attenuating a background signal of an audio signal, wherein the apparatus comprises: a signal characteristics provider configured to receive or to determine signal characteristics information on one or more characteristics of the audio signal, wherein the signal characteristics information depends on the background signal, wherein the signal characteristics information comprises a sequence of input gains which depends on the background signal and on a foreground signal of the audio signal; and a gain sequence generator configured to determine the sequence of output gains depending on the sequence of input gains; wherein, to determine the sequence of outputs gains, to modify a current gain value of a current gain of the sequence of output gains to a target gain value, the gain sequence generator is configured to determine a plurality of succeeding gains, which succeed the current gain in the sequence of output gains, by gradually changing the current gain value according to a modification rule during a transition period to the target gain value, wherein the modification rule depends on the signal characteristics information; and/or wherein the gain sequence generator is configured to determine the target gain value depending on a further one of the one or more signal characteristics in addition to the sequence of input gains.

Another embodiment may have a system for generating an audio output signal, wherein the system comprises: an apparatus according to the invention, and an audio mixer for generating the audio output signal, wherein the audio mixer is configured to receive the sequence of output gains from the apparatus according to the invention, wherein the audio mixer is configured to amplify or attenuate a background signal by applying the sequence of output gains on the background signal to acquire a processed background signal, and wherein the audio mixer is configured to mix a foreground signal and the processed background signal to acquire the audio output signal.

Another embodiment may have a method for providing a sequence of output gains, wherein the sequence of output gains is suitable for attenuating a background signal of an audio signal, wherein the method comprises: receiving or determining signal characteristics information on one or more characteristics of the audio signal, wherein the signal characteristics information depends on the background signal, wherein the signal characteristics information comprises a sequence of input gains which depends on the background signal and on a foreground signal of the audio signal; and determining the sequence of output gains depending on the sequence of input gains; wherein, to determine the sequence of outputs gains, modifying a current gain value of a current gain of the sequence of output gains to a target gain value is conducted, such that a plurality of succeeding gains, which succeed the current gain in the sequence of output gains, is determined by gradually changing the current gain value according to a modification rule during a transition period to the target gain value, wherein the modification rule depends on the signal characteristics information; and/or wherein the target gain value is determined depending on a further one of the one or more signal characteristics in addition to the sequence of input gains.

Another embodiment may have a non-transitory digital storage medium having a computer program stored thereon to perform the method for providing a sequence of output gains, wherein the sequence of output gains is suitable for attenuating a background signal of an audio signal, wherein the method comprises: receiving or determining signal characteristics information on one or more characteristics of the audio signal, wherein the signal characteristics information depends on the background signal, wherein the signal characteristics information comprises a sequence of input gains which depends on the background signal and on a foreground signal of the audio signal; and determining the sequence of output gains depending on the sequence of input gains; wherein, to determine the sequence of outputs gains, modifying a current gain value of a current gain of the sequence of output gains to a target gain value is conducted, such that a plurality of succeeding gains, which succeed the current gain in the sequence of output gains, is determined by gradually changing the current gain value according to a modification rule during a transition period to the target gain value, wherein the modification rule depends on the signal characteristics information; and/or wherein the target gain value is determined depending on a further one of the one or more signal characteristics in addition to the sequence of input gains, when said computer program is run by a computer.

An apparatus for providing a sequence of output gains, wherein the sequence of output gains is suitable for attenuating a background signal of an audio signal is provided. The apparatus comprises a signal characteristics provider configured to receive or to determine signal characteristics information on one or more characteristics of the audio signal, wherein the signal characteristics information depends on the background signal, wherein the signal characteristics information comprises a sequence of input gains which depends on the background signal and on a foreground signal of the audio signal. Moreover, the apparatus comprises a gain sequence generator configured to determine the sequence of output gains depending on the sequence of input gains. To determine the sequence of outputs gains, to modify a current gain value of a current gain of the sequence of output gains to a target gain value, the gain sequence generator is configured to determine a plurality of succeeding gains, which succeed the current gain in the sequence of output gains, by gradually changing the current gain value according to a modification rule during a transition period to the target gain value. The modification rule depends on the signal characteristics information; and/or the gain sequence generator is configured to determine the target gain value depending on a further one of the one or more signal characteristics in addition to the sequence of input gains.

Moreover, a method for providing a sequence of output gains, wherein the sequence of output gains is suitable for attenuating a background signal of an audio signal is provided. The method comprises:

- Receiving or determining signal characteristics information on one or more characteristics of the audio signal, wherein the signal characteristics information depends on the background signal, wherein the signal characteristics information comprises a sequence of input gains which depends on the background signal and on a foreground signal of the audio signal. And
- Determining the sequence of output gains depending on the sequence of input gains.

To determine the sequence of outputs gains, modifying a current gain value of a current gain of the sequence of output gains to a target gain value is conducted, such that a plurality of succeeding gains, which succeed the current gain in the sequence of output gains, is determined by gradually changing the current gain value according to a modification rule during a transition period to the target gain value. The modification rule depends on the signal characteristics information. And/or the target gain value is determined depending on a further one of the one or more signal characteristics in addition to the sequence of input gains.

Furthermore, a computer program for implementing the above-described method when being executed on a computer or signal processor has been provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
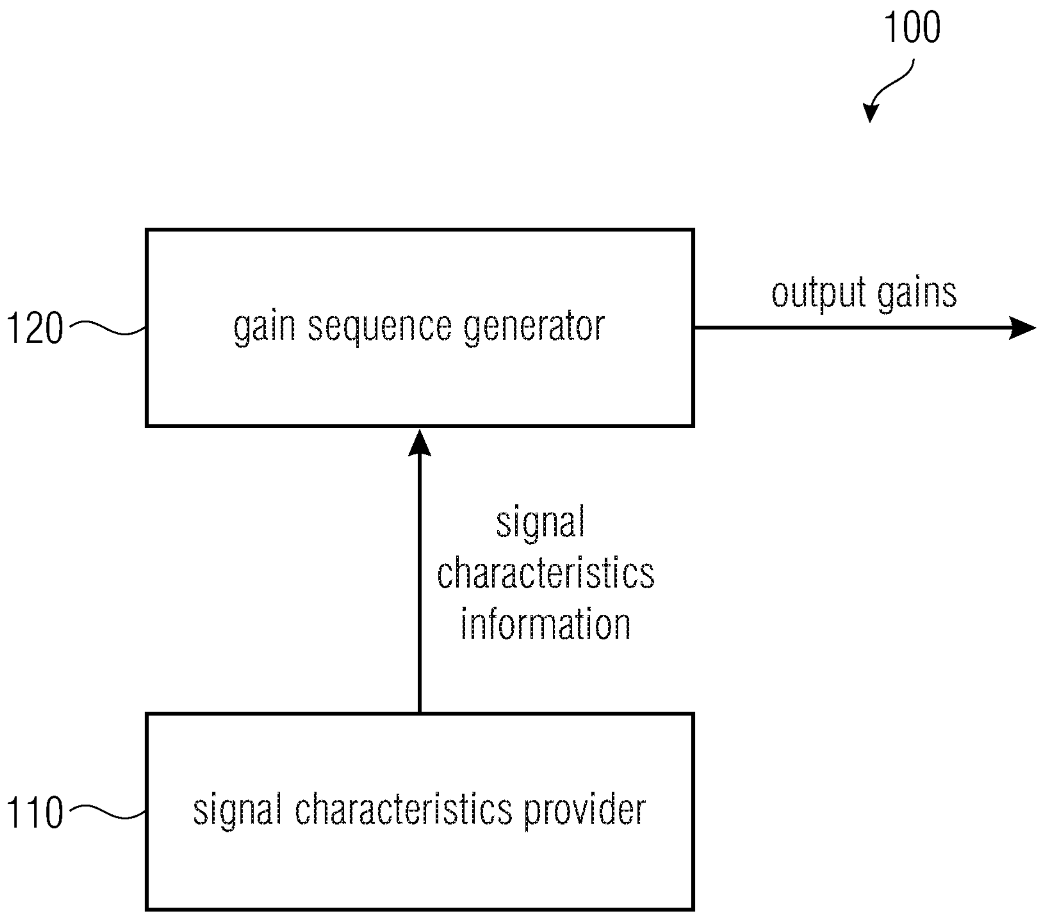
FIG. 1 illustrates an apparatus for providing a sequence of output gains according to an embodiment.

FIG. 1 illustrates an apparatus 100 for providing a sequence of output gains, wherein the sequence of output gains is suitable for attenuating a background signal of an audio signal according to an embodiment.

The apparatus 100 comprises a signal characteristics provider 110 configured to receive or to determine signal characteristics information on one or more characteristics of the audio signal, wherein the signal characteristics information depends on the background signal. The signal characteristics information comprises a sequence of input gains which depends on the background signal and on a foreground signal of the audio signal.

Moreover, the apparatus 100 comprises a gain sequence generator 120 configured to determine the sequence of output gains depending on the sequence of input gains.

To determine the sequence of outputs gains, to modify a current gain value of a current gain of the sequence of output gains to a target gain value, the gain sequence generator 120 is configured to determine a plurality of succeeding gains, which succeed the current gain in the sequence of output gains, by gradually changing the current gain value according to a modification rule during a transition period to the target gain value.

The modification rule depends on the signal characteristics information, and/or the gain sequence generator 120 is configured to determine the target gain value depending on a further one of the one or more signal characteristics in addition to the sequence of input gains.

E.g., gradually changing from the current gain value to the target gain value means that an immediate successor of the current gain has a gain value having an intermediate value between the current gain value and the target gain value (while the intermediate value is different from the current gain value and is different from the target gain value). The immediate successor of the current gain does not have a gain value being equal to the target gain value, because the gain value is gradually changed from the current gain value to the target gain value during the transition period (instead of jumping from the current gain value of the current gain to the target gain value already for the immediate successor of the current gain). Changing the current gain value to the target gain value gradually during the transition period, e.g., realizes a smooth transition. For example, a transition from a non-attenuated background signal to an attenuated background signal; or, for example, a transition from an attenuated background signal to a non-attenuated background signal.

The gradual change from the current gain value to the target gain value is conducted depending on a modification rule which depends on a signal characteristic of the audio signal. E.g., that means that the transition from the current gain value is done in a first way, if the signal characteristic has a first property, and that the transition from the current gain value is done in a different second way, if the signal characteristic has a different second property.

Such a property of the signal characteristic may, e.g., depend on the sequence of input gains. For example, depending on how the input gain value is defined, a smaller input gain value may, for example, indicate a greater disturbance of a foreground signal by a background signal compared to a disturbance of the foreground signal by the background signal, when the input gain value is larger.

Or, a signal property of the signal characteristic may, e.g., be that the background signal comprises speech, or that the background signal does not comprise speech, or may, e.g., be a probability for the presence of speech in the background signal.

E.g., the modification rule defines a gain value curve between a current gain having the current gain value and a later gain having the target gain value. E.g., such a gain value curve may, e.g., differ in case the signal characteristics information, on which the modification rule depends, differs.

According to an embodiment, the sequence of input gains may, e.g., depend on the background signal and on the foreground signal and on a clearance value. Clearance, e.g., the clearance value may, e.g., be a parameter, indicated as (e.g., one or more) positive values, which defines the desired minimum margin between foreground and background signals to be achieved after that ducking gains are applied in order to have good intelligibility of the foreground signal.

In an embodiment, the gain value of each input gain of the sequence of input gains may, for example, depend on a level of the background signal and on a level of the foreground signal of the audio signal.

In a specific embodiment, the gain value of each input gain of the sequence of input gains may, for example, depend on a level difference between a level of the foreground signal and a level of the background signal.

For example, in a very specific embodiment, the gain value of each input gain of the sequence of input gains may, for example, be defined as:

$$g_{in} = \min(0, level_{foreground} - level_{background} - \text{clearance})$$

Or, the gain value may, for example, be defined as:

$$g_{in} = \min(0, level_{foreground} - level_{background} + \text{clearance})$$

Or, the gain value may, for example, be defined as:

$$g_{in} = \max(0, level_{background} - level_{foreground} + \text{clearance})$$

Or, the gain value may, for example, be defined as:

$$g_{in} = \max(0, level_{background} - level_{foreground} - \text{clearance})$$

Or, the gain value may, for example, be defined as:

$$g_{in} = level_{foreground} - level_{background}$$

Or, the gain value may, for example, be defined as:

$$g_{in} = level_{background} - level_{foreground}$$

In the above exemplifying formulae, $\text{level}_{foreground}$ indicates a level of the foreground signal in, $\text{level}_{background}$ indicates a level of the background signal, and clearance may, e.g., indicates the clearance value, e.g., as defined above.

For example, the foreground signal, the background signal and the clearance value may, e.g., be defined in a decibel domain or in a bel domain (may, e.g., be decibel values or bel values).

In further, particular specific embodiments, in the first four formulae above, which employ clearance, clearance may, for example, be defined as clearance=Applied_Clearance, wherein $$\text{Applied\_Clearance}(t) = \text{Clearance} + (\text{Voice\_over\_Voice\_Clearance} - \text{Clearance}) \cdot p(VAD)_{filtered}(t)$$

as defined further below.

In further embodiments, the sequence of input gains may, e.g., be defined in a linear domain.

An input gain of the sequence of input gains may, e.g., provide a first initial indication if a disturbance of the foreground signal by the background signal is still tolerable or not.

For example, in the above first two min formulae, the input gain may, e.g., initially indicate that the disturbance the foreground signal by the background signal is still tolerable, if the input gain value is 0. In these formulae, the input gain value may, e.g., initially indicate that the disturbance the foreground signal by the background signal no longer tolerable, if the input gain value smaller than 0.

For example, in the above second two max formulae, the input gain may, e.g., initially indicate that the disturbance the foreground signal by the background signal is still tolerable, if the input gain value is 0. In these formulae, the input gain value may, e.g., initially indicate that the disturbance the foreground signal by the background signal no longer tolerable, if the input gain value greater than 0.

In an embodiment, if the initial sequence of input gains indicates so, the apparatus 100 may, e.g., then determine, if the sequence of output gains shall really indicate that the background signal shall be attenuated by determining the sequence of output gains according to the embodiments described herein. To this end, in an embodiment, the apparatus 100 is configured to modify the sequence of input gains to obtain the (final) sequence of output gains.

In an embodiment, the target gain value may, e.g., depend on a further one of the one or more signal characteristics in addition to the sequence of input gains. Such a further one of the one or more signal characteristics in addition to the sequence of input gains may, e.g., be that the background signal comprises speech, or that the background signal does not comprise speech, or may, e.g., be a probability for the presence of speech in the background signal.

According to an embodiment, the foreground signal and background signal may, e.g., be encoded within a sequence of audio frames, and/or wherein the audio signal may, e.g., be encoded within the sequence of audio frames. The sequence of output gains to be determined by the gain sequence generator 120 may, e.g., be a current sequence of output gains being associated with a current frame of the sequence of audio frames. For determining the current sequence of output gains, the gain sequence generator 120 may, e.g., be configured to use information being encoded within a current frame of the sequence of audio frames, without using information encoded in a succeeding frame of the sequence of audio frames, which succeeds the current audio frame in time. This embodiment describes a situation usually present in real-time scenarios.

According to an embodiment, the gain sequence generator 120 may, e.g., be configured to determine the sequence of output gains in a logarithmic domain, such that the sequence of output gains is suitable for being subtracted from or added to a level of the background signal. Or, in another embodiment, the gain sequence generator 120 may, e.g., be configured to determine the sequence of output gains in a linear domain, such that the sequence of output gains is suitable for dividing the plurality of samples of the background signal by the sequence of output gains, or such that the sequence of output gains is suitable for being multiplied with the plurality of samples of the background signal.

Figure 2:
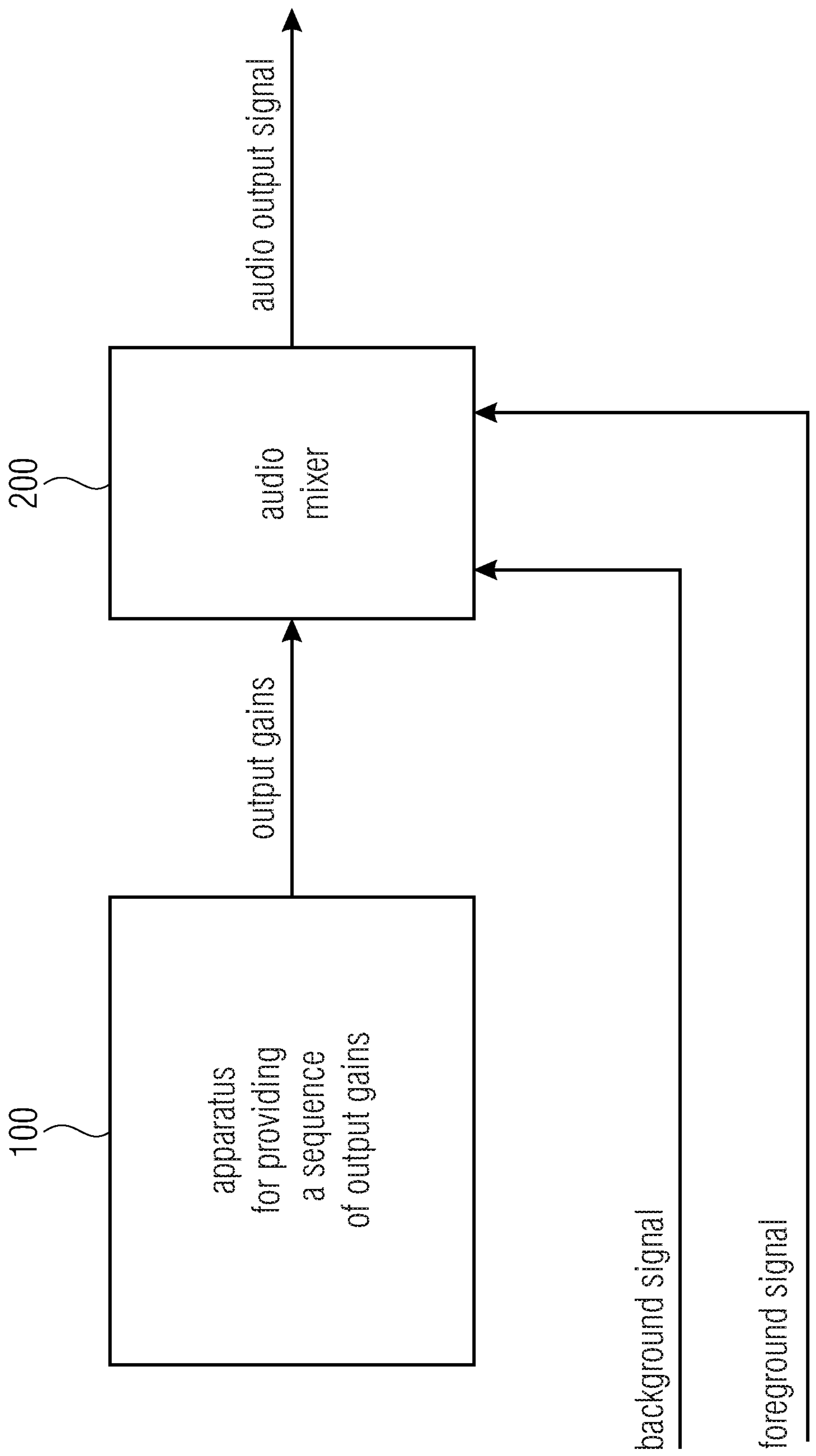
FIG. 2 illustrates system for generating an audio output signal according to an embodiment.

FIG. 2 illustrates system for generating an audio output signal according to an embodiment.

The system of FIG. 2 comprises the apparatus 100 of FIG. 1 and an audio mixer 200 for generating the audio output signal.

The audio mixer 200 is configured to receive the sequence of output gains from the apparatus 100.

The audio mixer 200 is configured to amplify or attenuate a background signal by applying the sequence of output gains on the background signal to obtain a processed background signal.

The audio mixer 200 may, e.g., be configured to mix a foreground signal and the processed background signal to obtain the audio output signal.

In an embodiment, the plurality of output gains may, e.g., be represented in a logarithmic domain, and the audio mixer 200 may, e.g., be configured to subtract the plurality of output gains or a plurality of derived samples, being derived from the plurality of output gains, from a level of the background signal to obtain the processed background signal. Or, the plurality of output gains may, e.g., be represented in the logarithmic domain, and the audio mixer 200 may, e.g., be configured to add the plurality of output gains or the plurality of derived samples to the level of the background signal to obtain the processed background signal.

Or, in another embodiment, the plurality of output gains may, e.g., be represented in a linear domain, and the audio mixer 200 may, e.g., be configured to divide the plurality of samples of the background signal by the plurality of output gains or by the plurality of derived samples to obtain the processed background signal. Or the plurality of output gains may, e.g., be represented in the linear domain, and the audio mixer 200 may, e.g., be configured to multiply the plurality of output gains or the plurality of derived samples with the plurality of samples of the background signal to obtain the processed background signal.

Figure 3:
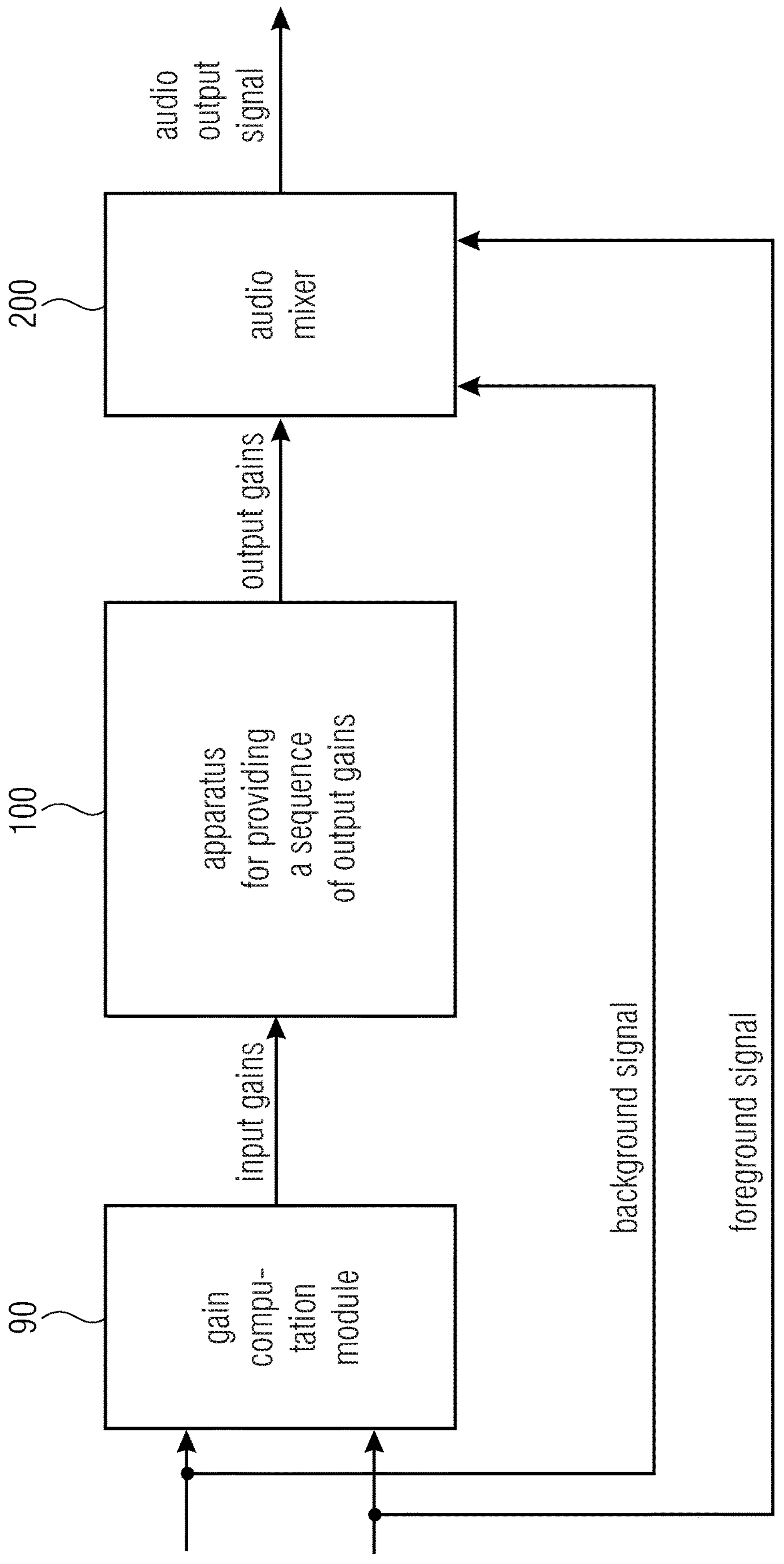
FIG. 3 illustrates the system for generating an audio output signal of FIG. 2, wherein the system further comprises a gain computation module.

FIG. 3 illustrates the system for generating an audio output signal of FIG. 2, wherein the system further comprises a gain computation module 90.

The gain computation module of FIG. 3 may, e.g., be configured to calculate a sequence of input gains depending on the foreground signal and on the background signal, and is configured to feed the sequence of input gains into the apparatus 100.

Figure 4:
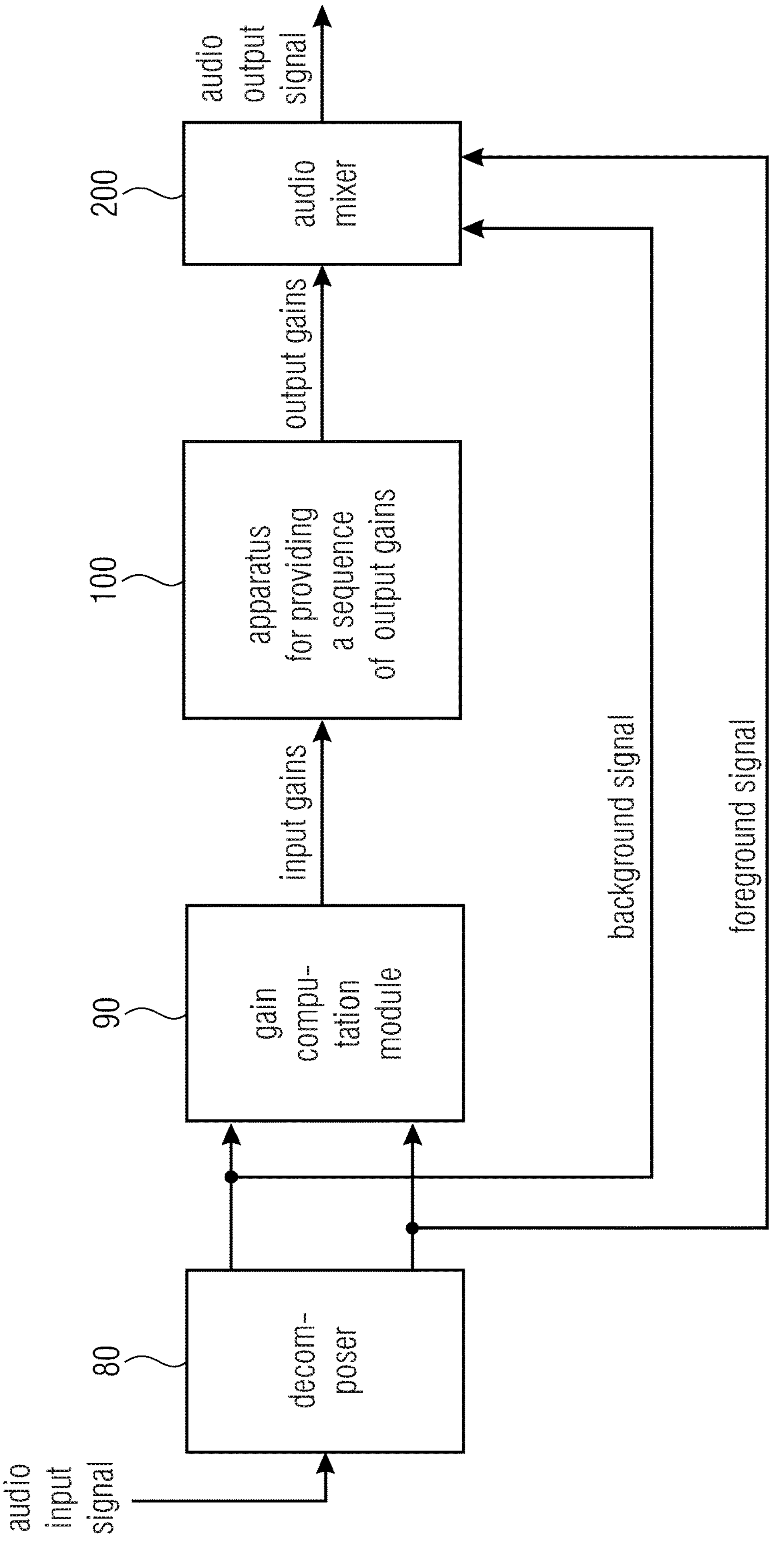
FIG. 4 illustrates the system for generating an audio output signal of FIG. 3, wherein the system further comprises a decomposer.
Figure 5:
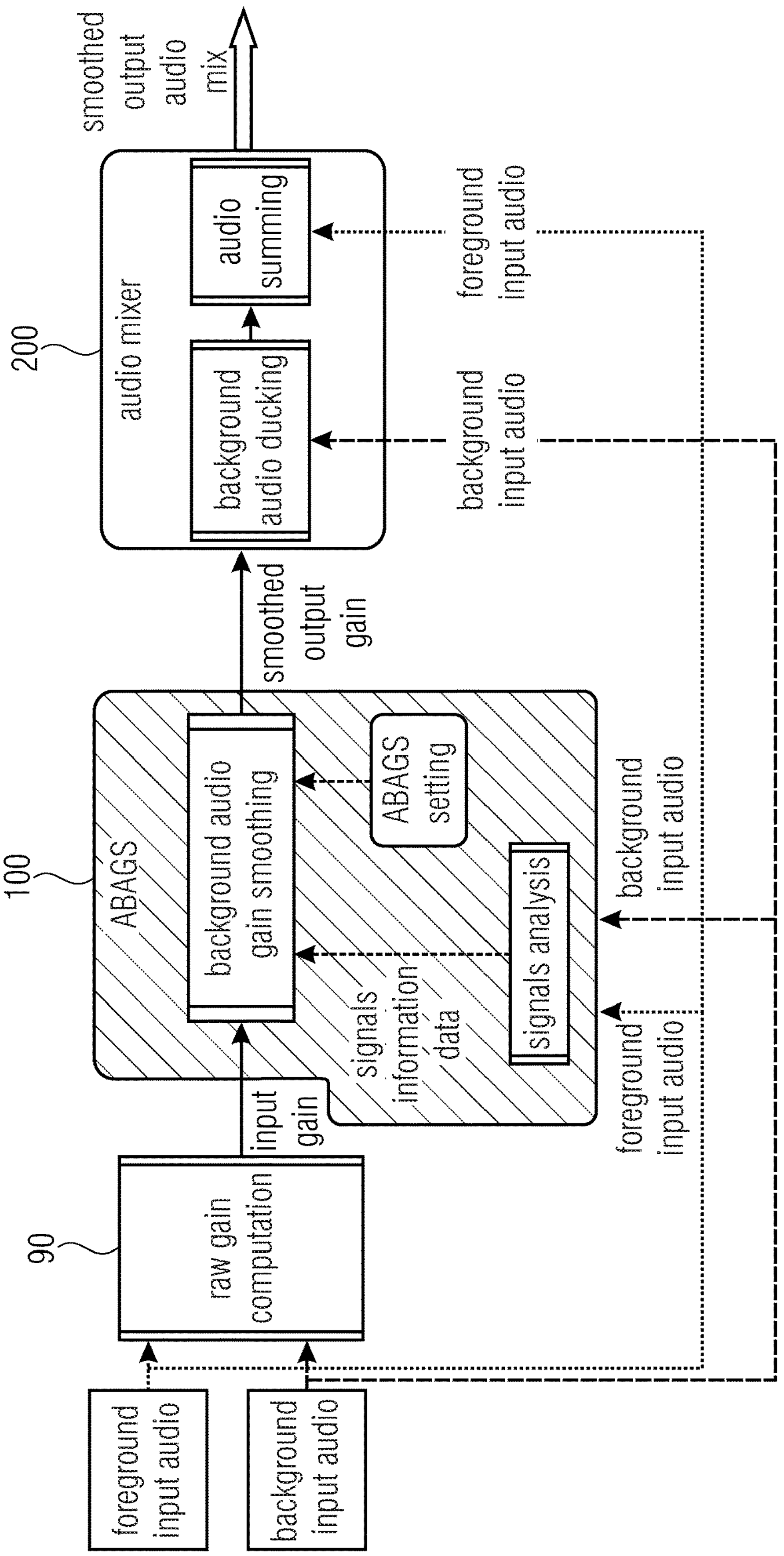
FIG. 5 illustrates an ABAGS block diagram according to an embodiment.

FIG. 4 illustrates the system for generating an audio output signal of FIG. 3, wherein the system further comprises a decomposer 80.

The decomposer 80 of FIG. 4 may, e.g., be configured to decompose an audio input signal into the foreground signal and into the background signal. Moreover, the decomposer 80 may, e.g., be configured to feed the foreground signal and the background signal into the gain computation module 90 and into the mixer 200.

Embodiments realize content-aware concepts for (e.g., post-) processing time-varying mixing gain signals produced for attenuating background audio signals in the context of automixing.

In particular embodiments, the mixing gain signal controls how the two audio component signals are mixed together: a foreground signal s(t) (target signal whose audibility/information is of high priority) and a background signal b(t) (secondary signal with a lower importance). More specifically, the time-varying mixing gain signal g(t) is applied to the background signal prior being mixed together with the foreground signal:

$$x(t) = h(t)s(t) + g(t)b(t),$$

wherein h(t) is a second mixing gain signal applied on the foreground component signal. In the following, we assume h(t)=1, for reasons of simplicity.

One of the goals of an automixing system is to ultimately produce a mixed program such that the audibility or information transport of the foreground signal is still guaranteed. The side-goal, equally important, is to provide an esthetically pleasant mixed output program. The mixing gain signal produced by state-of-the-art solutions may be such that it guarantees the accomplishing of the primary goal, but the resulting output program is not esthetically pleasant as it is produced taking no consideration of the semantic characteristics of the input signals. This issue is particularly evident in real-time operations where only a very limited look-ahead size is allowed.

Some particular embodiments relate to post-processing operations applied to the time-varying input gain sequence used for attenuating the background signal. These post-processing operations are controlled by data generated by various tools designed to analyze the semantic characteristics carried in the input audio signals and to modify the input gain sequence accordingly.

Such collected information is used adaptively by the proposed method for smoothing the input raw gain data in order to accommodate the highest perceptual audio quality.

The post-processing steps can be viewed to implement the modification relation $$g_{out}(t) = (1 - \alpha(t))g_{out}(t-1) + \alpha(t)g_{in}(t),$$

or more precisely with $$g_{out}(t) = (1-\alpha(t))g_{out}(t-1) + \alpha(t)g_{target}(t),$$
$$= (1-\alpha(t))g_{out}(t-1) + \alpha(t)g_{in}(t) + f(\text{state}(t)),$$

wherein $g_{in}(t)$ is the input gain value at time instant t $g_{out}(t)$ is the output gain value at time instant t $g_{out}(t-1)$ is the output gain value at time instant (t−1)

Figure 6:
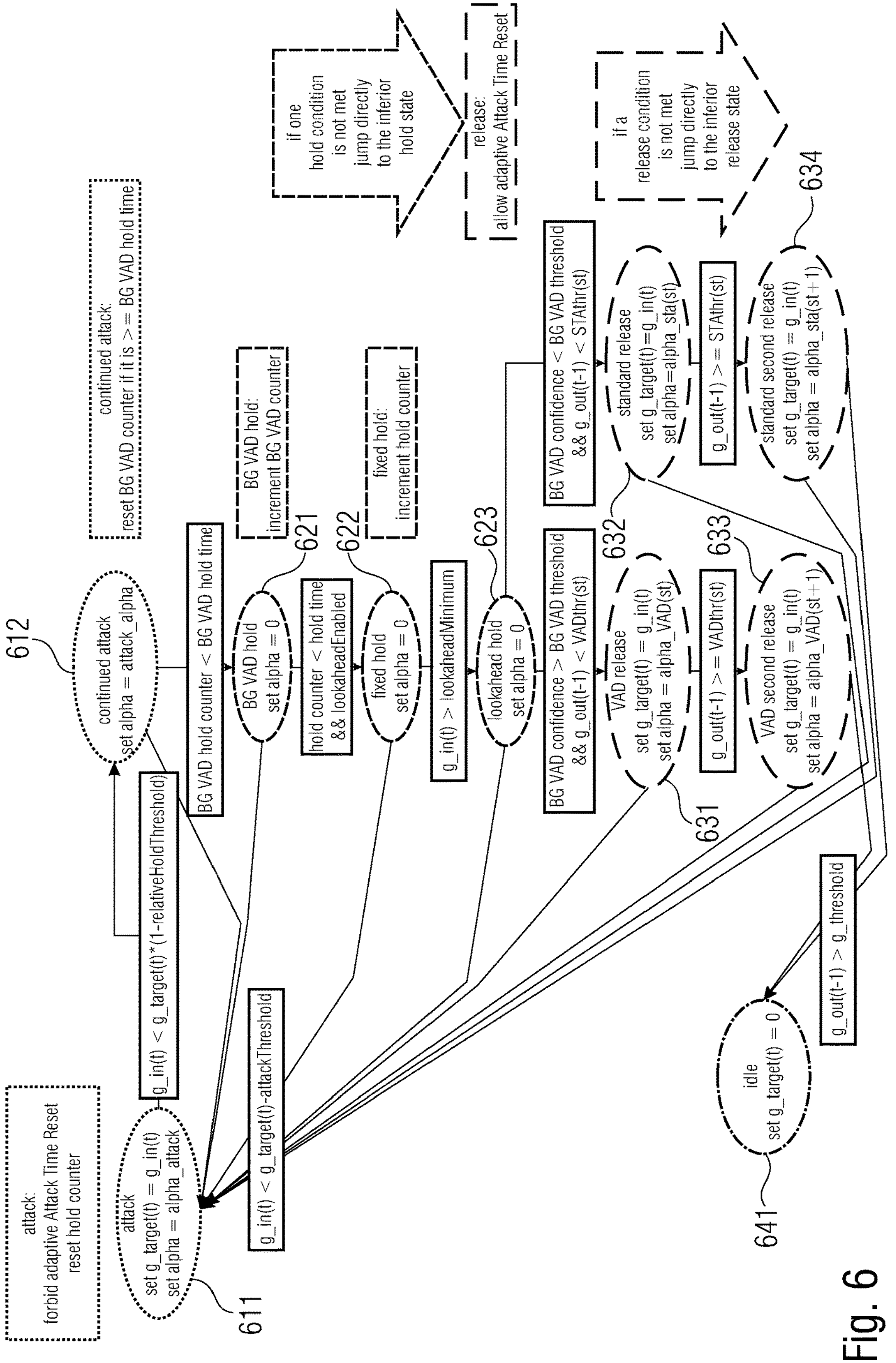
FIG. 6 illustrates a finite state machine for gain smoothing according to an embodiment.

$g_{target}(t)$ is the target gain value at time instant t, determined based on the current smoothing state, input raw gain value $g_{in}(t)$ $f(\text{state}(t))$ is a function dependent on the actual state of the finite state machine shown in FIG. 6

$\alpha(t)$ is a value determined from the smoothing coefficient, determined based on the collected information for the time instant t, and t is the time instant when $g_{in}$ and $g_{out}$ are sampled.

In particular specific embodiments, $g_{in}(t)$ and/or $g_{target}(t)$ may, for example, depend on a background VAD confidence.

According to a particular specific embodiment, $g_{target}(t)$ may, for example depend on $g_{out}(t-1)$.

It is possible to use some different control mechanism instead of the first-order infinite impulse response relationship provided in the equation above, but this is the advantageous embodiment.

The effect of these post-processing operations includes modifying the temporal evolution and the absolute value of the input gain values $g_{in}(t)$ (i.e., Attack Time, Hold Time, Release Time, Ducking Depth) such that applying the resulting output gain sequence $g_{out}(t)$ to the background signal produces a more esthetically pleasant mixed program. Consequently, this method better fulfils the requirements for content-agnostic automixing in the real-time domain. In fact, the architecture of the proposed method consists of several individual processing components which jointly contribute to circumvent the constraint of a limited look-ahead.

Figure 7:
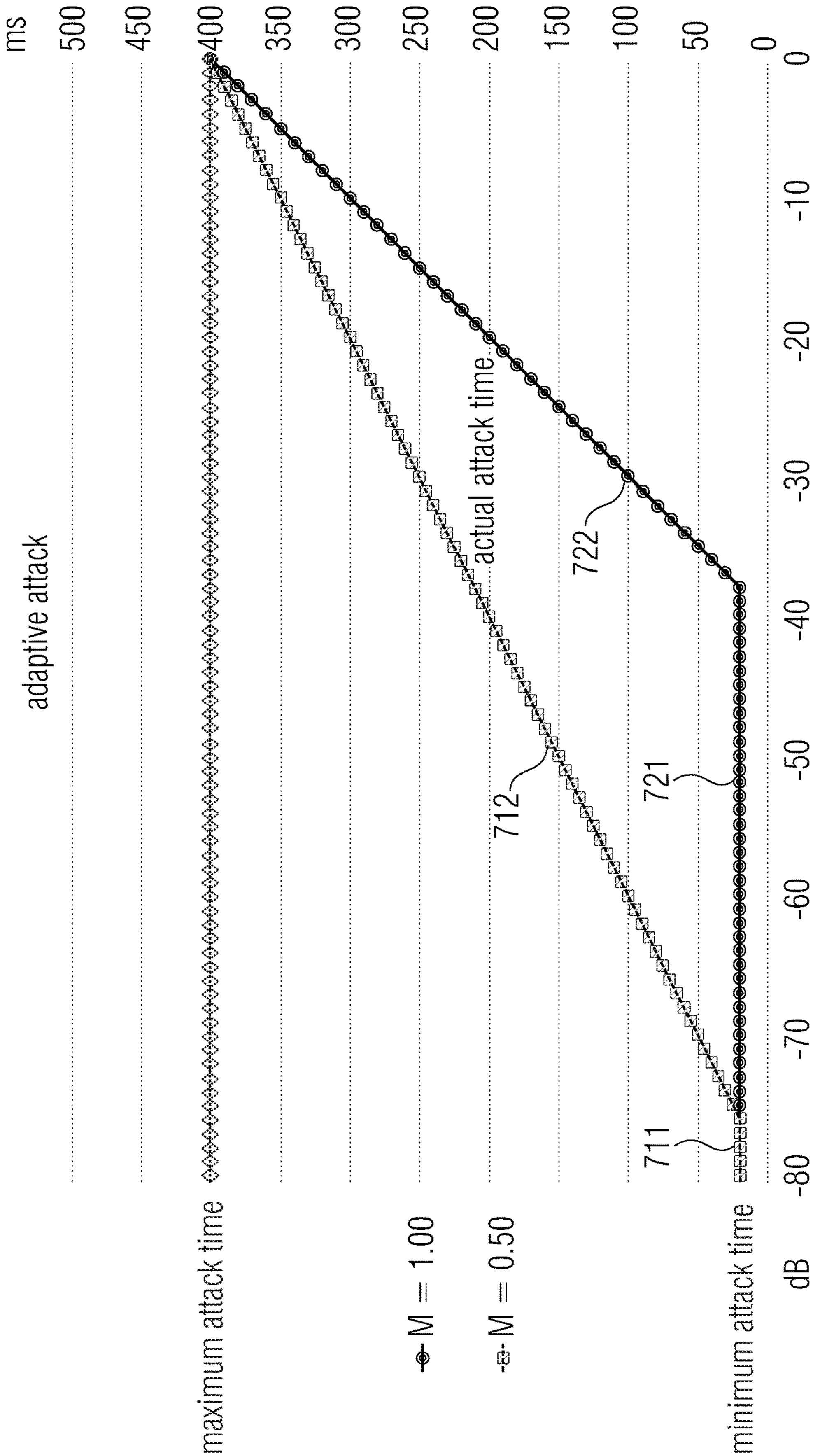
FIG. 7 illustrates an adaptive attack transfer function according to an embodiment.

FIG. 7 illustrates an ABAGS block diagram according to an embodiment, which illustrates the processing flow described above.

In FIG. 7, a first line indicated by reference signs 711 and 712 depicts an adaptive attack with M=0.50. A second line indicated by reference signs 721 and 722 depicts an adaptive attack with M=1.00.

Embodiments provide a signal-adaptive temporal integration in level measurement improves the stability of the level estimates and improves the esthetic quality of the result, the signal-adaptive temporal smoothing of the resulting gain (curve) improves the esthetic quality of the output by removing "level pumping", and the main focus of the inventive method is in the short-term level clearance.

In particular embodiments, ABAGS consists of the following multiple parts, all together working towards the same common goal of producing convincing smoothed background gain sequence, namely Adaptive attack smoothing speed, multi-speed release speed, VoV (Voice-over-Voice) dynamic clearance, smoothing consistency To achieve the abovementioned goal the semantics characteristics of both input signals (foreground and background, such as speech content presence in the signal, spectral distribution, background noise presence) are analyzed, post-processed and used to control the post-processing of the input background ducking gain signal accordingly.

While the foreground input audio is assumed to consist of human speech, and in either mono, stereo, or multi-channel format, the background input audio can be a large variety of signals, for example, speech, and/or sustained instrument sound or music, and/or percussive instrument sound or music (with significant audio transients), and/or background natural ambient sound or artificial noise with specific spectral distribution (e.g., atmosphere, room tone, pink, with, or brown noise), and/or from monophonic to immersive audio formats.

Similarly to how human assisted mixing operations would be carried out in real use-cases, depending on the input content being processed several adaptations to the raw gain curve smoothing would be automatically applied by ABAGS in order to craft a convincing and pleasant output program mix.

These scenarios include the following possible input signal combinations:

Foreground=speech, background=sustained music (e.g., TV presenter commentating a music show)

Foreground=speech, background=percussive music (e.g., Radio speaker introducing a music track)

Foreground=speech, background=speech (e.g., simultaneous translation)

Foreground=speech, background=noise or diffuse ambience sound (e.g., Audio Description or commentator talking over crowd sound of a sport event)

Speech could be presented with or without interfering background noise.

Examples of the automatic adaptations automatically triggered as a result of the semantic analysis may, for example be:

When there is speech present in the foreground signal, the mixing gain needs to attenuate the background signal so that the target speech signal properties (e.g., intelligibility) are not compromised.

If there is speech present simultaneously in the background signal, the mixing gain needs to attenuate the background more than in the case it does not comprise speech, in order to avoid informational masking, implemented with the sub-part VoV dynamic clearance.

When the speech presence in the foreground signal stops, and there is speech present in the background signal, the mixing gain is adapted smoothly so that the attenuation of the background signal is removed. This allows retaining the speech content in the background signal (implemented with the sub-part "Multi-speed release speed").

When speech presence in the foreground starts (or continues), the raw gain $g_{in}$ requires a significant attenuation of the background, and the actual attenuation value in smoothed gain $g_{out}$ is deviating significantly from it, the gain smoothing attack speed is adjusted proportionally higher until the requested background attenuation has been accomplished.

The Raw gain may vary rapidly over time. Unless the signal semantic analysis reveals significant changes in the signal content, hysteresis is applied in the gain smoothing in order to keep the background attenuation more consistent over time as long as the changes are below the given threshold.

The output signal generated by ABAGS is a Smoothed Output Gain $g_{out}(t)$. These are time-varying gain values which are applied to the background component (multiplication in linear value domain) to attenuate its signal during the automatic mixing.

A subsequent audio mixer processing module (not directly a part of ABAGS) uses the smoothed output gain to attenuate the background input audio where needed. The resulting background ducked audio signal is mixed with the foreground input audio for producing the automatically generated audio program mix.

In the following, a real-time automatic audio ducking use case is considered.

Offline ducking is unsuitable for low-latency applications, since for it to work in an esthetically pleasant manner, it needs access to future time samples from the input signals for the level estimation and in the temporal smoothing of the first-stage gain values.

Low latency (maximum few hundred milliseconds) is essential for real-time automatic audio ducking.

Embodiments aims at addressing these issues and at producing a smoothed gain curve capable of delivering a good esthetic output experience in the resulting mix, still respecting the processing latency constraints from the real-time applications.

However, the same features developed for addressing the real-time ducking use case can effectively be used for processing offline signals.

In the context of audio signal, the real-time domain may, e.g., occur when processing is computed within a look-ahead window size of, e.g., up to 200 ms.

In the following, specific advantages of ABAGS that allow it to address the drawbacks of Offline ducking for low-latency operations are discussed . . .

One fundamental aspect of ABAGS is that for smoothing of the input raw ducking gain it uses additional semantic information from the input signals in order to allow it to quickly adapt to the agnostic changes of the source content such to produce a smooth behavior during stationary signal parts, but also to react fast when needed.

Several embodiments coexist in ABAGS.

For example, four separate embodiments may, e.g., be implemented by ABAGS, namely:

Adaptive Attack Smoothing
Adaptive Multi-speed Release Smoothing
VoV Dynamic Clearance
Smoothing Consistency In the following an overview of the above separate embodiments will be provided, and afterwards, a detailed description of these embodiments follows.

In embodiments the provided gain smoothing processing provided by ABAGS consists of adaptively amending the raw gain curve by means of setting parameters values, e.g., attack, release and hold time constants, and clearance such that the output mixed program results esthetically pleasant.

In the following, general principles of adaptive attack time smoothing is described.

The attack time constant is not fixed, but it is adapted by means of comparing the foreground and the background level difference. The more disturbing the background signal is, the faster the Attack is. This ratio is also tuned by an additional multiplier ranging from 0 to 1.

Applying this adaptive attack time smoothing feature allows the ducking to adapt the speed of the ducking in relation to how loud is the background component compared to the foreground signal. In that way, the resulting audio mix is more pleasant and balanced regardless the modulation of the source components.

In the following, general principles of multi-speed release smoothing are described.

The release phase is split over time into multiple release sub-states. Each sub-state has a specific time constant and the transition between two states is based on threshold values of the previous output gain. Typically, the size (duration) of each sub-state increments from one to the next one. In case that speech content is detected on the background signal, the setting of the first Release sub-state is temporarily replaced with a sub-state which is set with faster time constant. This allows to release to background attenuation quickly and is beneficial as it allows the ducking to automatically adapt its behavior in case the background component presents speech parts meant to be reproduced at their original level.

In the following, general principles of VoV Dynamic Clearance are described.

ABAGS may, e.g., comprise a Voice Activity Detection algorithm (VAD) which is used for signaling the presence of speech in the background component and for consequently adapting the gain smoothing parameters of the algorithm including Clearance, Hold, and Release. For example:

VOV Dynamic Clearance: because of different efficiency of measuring speech vs music loudness, a greater ducking is required for Voice-over-Voice scenarios. The VoV Dynamic Clearance relies on the VAD instantiated on the background signal chain and increments the Clearance value in real-time proportionally to the confidence value generated by the VAD algorithm. The VAD confidence is a measure of the probability of the algorithm that there is speech present. Using the real-value confidence instead of the binary “speech present”/“speech not present” allows a more flexible operation.

VAD Hold: in case speech is detected in the background signal, an additional Hold step is applied before the Release step, and proportionally to the confidence value generated by the VAD algorithm. This helps ABAGS in reacting more pleasantly to any source audio yet smoothing the output gain sequence when needed.

Release: in case of speech being detected during the release step, the release time constants are replaced with specific values set typically in a way to allow the background level to return to its original value much more quickly. This permits the algorithm to generate consistent speech levels across foreground and background during program parts where ducking is not triggered.

In the following, general principles of smoothing consistency, in particular, regarding the Attack Threshold and the Relative Hold Threshold, are described.

Due to the fast fluctuations in the first computed gain, the temporal smoothing algorithm applies attack and release processing in a rapid manner. This typically leads to a very unpleasant “pumping” effect.

To solve this problem, we introduce hysteresis into the gain smoothing. Attack Threshold is the hysteresis to ensure that attack-step of the smoothing is only triggered when the current input gain falls below the target gain minus attack threshold. In other words, small variations in the gain are ignored and only significant ducking (compared to the current value) is considered as meaningful and triggering the attack-step of the smoothing. This feature reduces the number of erroneous attacks and improves the ducking result in terms of stability. In a advantageous embodiment, the attack threshold is defined in absolute units of dB.

Complementary to the attack threshold, a hold threshold used for hysteresis. It ensures that a hold step is only triggered when the input gain increases by more than a given percentage with respect to the target gain. This feature reduces the number of releases to a very appropriate number as it keeps the ducking level constant when the dialogue gets softer, during the appearance of softer phonemes and short speech pauses. In a advantageous embodiment, the hold threshold is defined as a ratio of the target gain, opposed to the absolute values of attack threshold.

In the following, embodiments of the present invention are described in more detail.

An embodiment of the post-processing of the raw input gain into the smoother output gain is implemented using a finite state machine (FSM) illustrated in FIG. 6.

In particular, FIG. 6 illustrates a finite state machine for gain smoothing according to an embodiment.

This FSM keeps track of the current ducking state of the algorithm (Attack, Hold, and Release) and implements the features referred to as Consistency Smoothing, background VAD Hold, and the Multi-speed Releases Consistency, which are described in the following subsections in more detail, and determines the appropriate smoothing parameter value $\alpha(t)$.

The output gain processing can be represented in the following equation:

$$g_{out}(t) = (1-\alpha(t))g_{out}(t-1) + \alpha(t)g_{in}(t),$$

or more precisely with $$\begin{aligned} g_{out}(t) &= (1-\alpha(t))g_{out}(t-1) + \alpha(t)g_{target}(t), \\ &= (1-\alpha(t))g_{out}(t-1) + \alpha(t))g_{in}(t) + f(\text{state}(t)), \end{aligned}$$

wherein $g_{in}(t)$ is the input gain value at time instant t, $g_{out}(t)$ is the output gain value at time instant t, $g_{out}(t-1)$ is the output gain value at time instant (t−1), $g_{target}(t)$ is the target gain value at time instant t, determined based on the current smoothing state, input raw gain value $g_{in}(t)$, $f(\text{state}(t))$ is a function dependent on the actual state of the finite state machine shown in FIG. 6, $\alpha(t)$ is a value determined from the smoothing coefficient at time instant t, determined from the time constant associated with the current state, and the previous output gain value $g_{out}(t-1)$, t is the time instant when $g_{in}$ and $g_{out}$ are sampled.

In a particular embodiment, $g_{target}(t)$ may, e.g., be determined further based on the BG VAD consistency (t) and $g_{out}(t-1)$.

The value $\alpha(t)$ determined from the smoothing coefficient depends from the state S(t) in which the smoothing process is in as $$\alpha(t) = \begin{cases} \alpha_{idle}, & \text{if } S(t) == \text{Idle} \\ \alpha_{attack}, & \text{if } S(t) == \text{Attack} \\ \alpha_{hold}, & \text{if } S(t) == \text{Hold} \\ \alpha_{release}, & \text{if } S(t) == \text{Release} \end{cases}$$

The four possible main states (Idle, Attack, Hold, and Release) are illustrated in the state diagram of FIG. 6 with the reference signs:

Sub-States 611, 612: Sub-states that are related to an Attack state

Sub-States 621, 622, 623: Sub-states that are related to a Hold state Sub-States 631, 632, 633, 634: Sub-states that are related to a Release state Sub-State 641: Sub-state that is related to an Idle state Each of the four main states may be further split into sub-states for a more fine-grained control of the process. These are exemplified in FIG. 6 by the multiple states of the same outline.

In the following the functionality of the FSM is described by going through a usual transition of the individual states:

Initially, the FSM is in the Idle state. In this state the target gain is set to zero: $g_{target}(t)=0$ In the Idle state the output gain is around zero: $g_{out}(t)\approx 0$ Once the input gain falls below the attack threshold the Attack state is triggered. In this state the target gain is set to the raw input gain value: $g_{target}(t)=g_{in}(t)$ Furthermore the alpha is set to the attack_alpha: $\alpha(t)=\alpha_{attack}$ As long as no hold is triggered the Continued Attack state is triggered. In this Continued Attack state, the output gain is modified to the target gain value over time with respect to the Adaptive Attack time.

Once the raw input gain exceeds the Relative Hold Threshold, the background VAD Hold state is triggered. During this state the output gain is held constantly at the target gain until the background VAD Hold Time is reached.

Then the Fixed Hold is triggered. During this state the output gain is held constantly at the target gain until the fixed hold time is reached.

Then the Lookahead Hold is triggered. During this state the output gain is held constantly if the minimum value of the input gain lookahead buffer is smaller than the current raw input gain. This state ensures that when there is another attack followed by a Release within the lookahead buffer, the output gain is held constantly.

After the Hold states the Release states are triggered. When there is voice activity in the background signal a VAD Release sub-state is triggered followed by a $2^{nd}$ VAD Release sub-state. Otherwise a Release sub-state is triggered followed by a $2^{nd}$ Release sub-state. During the Release states once again the target gain is set to the raw input gain and the output gain is modified to the target gain value over time.

When the target gain was set to zero, the output gain is also modified to approximately zero over time. Once the output gain reaches a value of approximately zero, the Idle state is triggered again.

It should be noted that the Continued Attack state, Idle state as well as all Hold and Release states can be interrupted by another Attack state if the raw input gain falls below the target gain minus the attack threshold: $g_{in}(t)<g_{target}(t)-\text{AttackThreshold}$ Moreover, it should be noted that if the condition for one hold/release state is not fulfilled, the next hold/release state is triggered.

The smoothing process steps through the state machine based on the transition conditions are given in the arrows in the diagram.

Self-transitions are omitted from the diagram for clarity and they occur unless any of the other transition conditions are fulfilled.

In the following, adaptive attack time smoothing according to embodiments is described in more detail.

According to an embodiment, to attenuate the background signal or to increase an attenuation of the background signal, the gain sequence generator 120 may, e.g., be configured to determine the plurality of succeeding gains, which succeed the current gain, by gradually changing the current gain value according to the modification rule during the transition period to the target gain value, such that a duration of the transition period depends on the signal characteristics information.

In an embodiment, a smaller first input gain value of a sequence of input gains may, e.g., result in a shorter first duration of the transition period compared to a second duration of the transition period when the second input gain value of a sequence of input gains is greater, if the smaller first input gain value indicates a greater disturbance of the foreground signal by the background signal than the second input gain value. Or, in another embodiment, a smaller first input gain value of a sequence of input gains may, e.g., result in a longer first duration of the transition period compared to a second duration of the transition period when the second input gain value of a sequence of input gains is greater, if the smaller first input gain value indicates a smaller disturbance of the foreground signal by the background signal than the second input gain value.

Such an embodiment is based on the finding that if the sequence of input gain values indicates a significant disturbance of the foreground signal by the background signal, a fast attenuation of the background signal is needed. In other situations, where the disturbance of the foreground signal by the background signal is not that significant, a smoother transition from the current level of the background signal to an attenuated level of the background signal is possible and useful, as a smoother transition is considered more pleasant by the listeners.

In an embodiment, the gain sequence generator 120 may, e.g., be configured to determine an adaptive attack time, such that a duration of the transition period during which the gain sequence generator is configured to determine the plurality of succeeding gains, which succeed the current gain, by gradually changing the current gain value depends on the adaptive attack time. Moreover, the gain sequence generator 120 may, e.g., be configured to determine the plurality of succeeding gains, which succeed the current gain, depending on the adaptive attack time.

According to an embodiment, the gain sequence generator 120 may, e.g., be configured to determine the adaptive attack time depending on an input gain value of one of the input gains of the sequence of input gains, or indicates an average of a plurality of input gain values of a plurality of input gains of the sequence of input gains, being stored within a current input gain buffer of the apparatus.

In an embodiment, the signal characteristics provider 110 may, e.g., be configured to determine the adaptive attack time depending on:

$$AAT(t) = \min\left(AAT(t-1), \max\left(minAT, \left(maxAT - M \cdot \frac{maxAT \cdot g_{mean}(t)}{maxGain}\right)\right)\right)$$

wherein AAT is the adaptive Attack Time, wherein minAT is the predefined minimum attack time, wherein maxAT is the predefined maximum attack time, wherein AAT (t−1) is set to maxAT, if it is allowed to reset the Adaptive Attack Time value, otherwise the previous value of AAT is used, $g_{mean}$ (t) indicates said input gain value of said one of the input gains of the sequence of input gains, or indicates the average of said plurality of input gain values of said plurality of input gains of the sequence of input gains, being stored within the current input gain buffer of the apparatus, M is a coefficient with $0<M<1$, and wherein maxGain depends on the predefined minimum applicable $g_{out}$ value, or wherein maxGain depends on the predefined maximum applicable $g_{out}$ value.

In an embodiment, the gain sequence generator 120 may, e.g., be configured to use the adaptive attack time to determine a smoothing coefficient, which defines for the transition period a degree of adaptation towards the target gain value from one of the plurality of succeeding gains to its immediate successor. The gain sequence generator 120 may, e.g., be configured to determine the plurality of succeeding gains, which succeed the current gain, depending on the smoothing coefficient.

According to an embodiment, the gain sequence generator 120 may, e.g., be configured to determine the plurality of succeeding gains, which succeed the current gain, by iteratively applying the smoothing coefficient on the target gain value and on a previously determined one of the plurality of succeeding gains.

According to an embodiment, the gain sequence generator 120 may, e.g., be configured to determine the plurality of succeeding gains, which succeed the current gain, by iteratively applying $$g_{out}(t) = (1-\alpha(t))g_{out}(t-1) + \alpha(t)g_{target}(t),$$

wherein $g_{out}(t)$ is the output gain value at time instant t, $g_{out}(t-1)$ is the output gain value at time instant (t−1), $g_{target}(t)$ is the target gain value at time instant t, $\alpha(t)$ is the smoothing coefficient, t is a time instant.

Particular exemplifying implementations of these embodiments are now described in more detail.

In the real-time domain, due to the limited look-ahead available, the speech intelligibility of the early frames being ducked could be negatively affected when the level of the background component is close or even higher than the foreground component. In this scenario a faster Attack Time is required. However, a slower Attack Time still suits well situations where the background level is lower than the foreground level.

In order to accommodate both scenarios, an Adaptive Attack Time is introduced, as specified and calculated in the following equation:

$$AAT(t) = \min\left(AAT(t-1), \max\left(minAT, \left(maxAT - M \cdot \frac{maxAT \cdot g_{mean}(t)}{maxGain}\right)\right)\right)$$

wherein maxAT is the maximum Attack Time applicable and is defined by the user, minAT is the predefined minimum attack time, AAT is the actual Attack Time used for calculating $g_{out}$ at each iteration, AAT(t−1) is set to maxAT, if it is allowed to reset the Adaptive Attack Time value, otherwise the previous value of AAT is used, $g_{mean}$ (t) indicates an input gain value of one of the input gains of the sequence of input gains, or indicates an average of a plurality of input gain values of a plurality of input gains of the sequence of input gains, being stored within a current input gain buffer of the apparatus, M is a coefficient ranging from 0 to 1, used for tuning the Adaptive Attack Time feature, maxGain depends on the predefined minimum applicable $g_{out}$ value (e.g., maxGain is the minimum applicable $g_{out}$ value; i.e. maximum attenuation gain value), or maxGain depends on the predefined maximum applicable $g_{out}$ value (e.g., maxGain is the maximum applicable $g_{out}$ value; i.e. maximum attenuation gain value), The smoothing parameter is obtained from the Adaptive Attack Time with $$\alpha_{attack} = f(AAT), \text{ wherein } f(\tau) = 1 - e^{-1/\tau},$$

is a function mapping the time constant T into a smoothing coefficient (this is only one of the many possible forms).

FIG. 7 illustrates an adaptive attack transfer function according to an embodiment.

In the following, multi-speed release smoothing is described in more detail.

In an embodiment, to reduce an attenuation of the background signal, the gain sequence generator 120 may, e.g., be configured to select, depending on the signal characteristics information, a modification rule candidate out of two or more modification rule candidates as the modification rule; wherein, in a particular embodiment, selecting a first one of the two or more modification rule candidates by the gain sequence generator 120 results in a shorter first duration of the transition period, during which the current gain value is gradually changed by the gain sequence generator 120 to the target gain value, compared to a second duration of the transition period, when a second one of the two or more modification rules is selected by the gain sequence generator 120.

According to an embodiment, the gain sequence generator 120 may, e.g., be configured to select the first one of the two or more modification rule candidates, if the signal characteristics information indicates that a current portion of the background signal comprises speech, or if the signal characteristics information comprises a confidence value for a probability that the background signal comprises speech, which is higher than a speech threshold value. The gain sequence generator 120 may, e.g., be configured to select the second one of the two or more modification rule candidates, if the signal characteristics information indicates that the current portion of the background signal does not comprise speech, or if the confidence value is lower than or equal to the speech threshold value.

Such an embodiment is inter alia based on the following finding: When a release occurs and an attenuation of the background signal is no longer necessary, the background signal is no longer (significantly) disturbing the foreground signal. For example, this may be the case, if the foreground signal no longer comprises foreground speech. In such a situation, if speech is present in the background signal, it is usually desired that such speech in the background signal (that, e.g., no longer disturbs foreground speech) is as soon as possible no longer attenuated. For this reason, a fast release (e.g., a short period for the transition from the hold state to the release state) is desired. The above embodiment realizes such a fast release.

In an embodiment, each of the two or more modification rule candidates may, e.g., define at least two sub-modification rules, wherein a first one of the at least two sub-modification rules is applied during a first sub-period of the transition period, wherein a second one of the at least two sub-modification rules is applied during a second sub-period of the transition period, wherein the second sub-period succeeds the first sub-period in time, and wherein the first one of the at least two sub-modification rules defines a faster adaptation towards the target gain value from one of the plurality of succeeding gains to its immediate successor compared to the second one of the at least two sub-modification rules.

In automatic signal processing like ducking, and especially when real-time level correction is required, setting fixed Release time constant might not be sufficient for generating an esthetically pleasant program. This is because fixed Release time constants would not necessarily match with the sonic and semantic characteristics of any background signal. This can therefore result in either a too fast or a too slow processing and thus can generate some degree of annoyance or of esthetical quality degradation of the generated automix.

The method proposed for adapting the release speed of an automatic gain processor introduces a multi-speed mechanism which, by allowing multiple concurrent settings, aims at overcoming the limitations caused by traditional single-speed time constant. It works by splitting the Release state into several (typical two or more) sub-states n. The transition between one sub-state and the following one is triggered when the applied smoothed Gain falls above a predetermined level threshold or when secondary information is passed (i.e., speech presence). This allows the processing speeds to change dynamically, depending on the modulation of the gain curve and the semantic characteristics of the input signals. The possible raw gain curve generated by the Multi-speed Release Smoothing feature is illustrated in FIG. 8.

Figure 8:
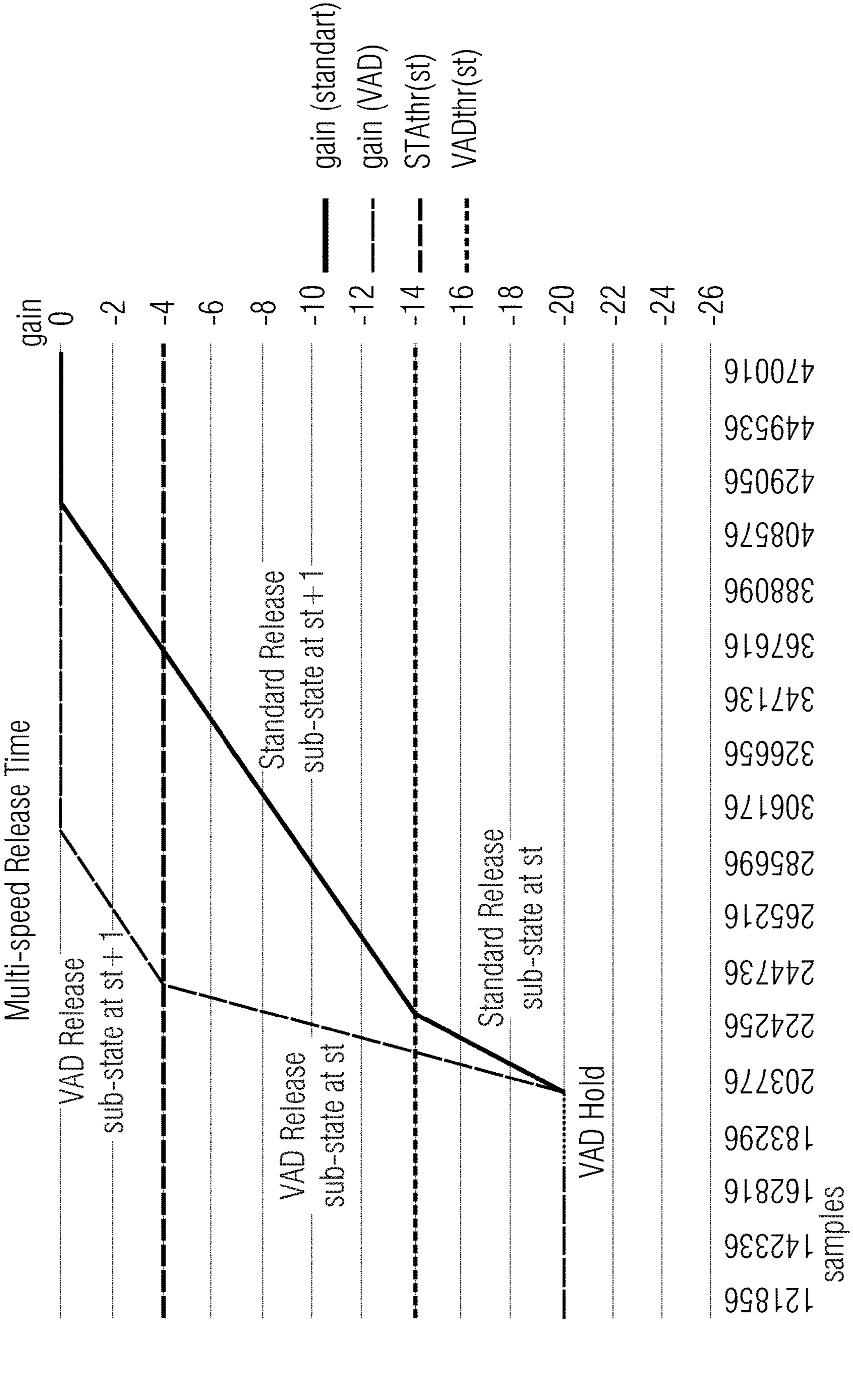
FIG. 8 illustrates examples for raw multi-speed release curves according to embodiments.

FIG. 8 illustrates examples for raw multi-speed release curves according to embodiments.

Instead of relying on single Release state, Multi-speed Release Smoothing splits that process into several sub-states $R_{st}$ where st, number of sub-states $R_{st}$, Release sub-state number st $R_{st}+1$, Release sub-state following $R_{st}$ $RT_{st}$, duration of Release sub-state $R_{st}$ $RTh_{st}$, Release sub-state Threshold used for triggering the Release sub-state $R_{st+1}$ ABAGS performs a real-time analysis of the background signal in order to detect whether significant speech is present. Consequently, the Release sub-states and the associated Release sub-state Thresholds can be of two following categories.

A standard Release sub-state (and corresponding Standard Release sub-state Threshold), is a release sub-state occurring when no significant speech activity is detected in the background signal VAD.

A release sub-state (and corresponding VAD Release sub-state Threshold), is a release sub-state occurring when significant speech activity is detected in the background signal.

In the example in FIG. 8, four possible Release sub-states are depicted, consisting of two Standard Release sub-states and two VAD Release sub-states.

When the conditions for applying the Release state are met, ABAGS begins to reduce the gain correction of the output signal, and based on the abovementioned analysis, the corresponding $R_{st}$ is triggered.

The conditions for defining which Release time-constant (or a value determined from the smoothing coefficient determined from the time constant) $\alpha_{release}$ is applied can be represented as follows:

$$\alpha_{release}(t) = \begin{cases} \alpha_{VAD(st)}, & \text{if } VAD \text{ is active and } g_{out}(t-1) < VADthr(st) \\ \alpha_{VAD(st+1)}, & \text{if } VAD \text{ is active and } g_{out}(t-1) \geq VADthr(st) \\ \alpha_{STA(st)}, & \text{if } VAD \text{ is inactive and } g_{out}(t-1) < STAthr(st) \\ \alpha_{STA(st+1)}, & \text{if } VAD \text{ is inactive and } g_{out}(t-1) \geq STAthr(st) \end{cases}$$

The time constant for each of the multiple sub-states are parameters defined during the implementation time of from the user input.

The start of a Release sub-state or the transition to the next one is depending on three factors:

Gain Level $g_{in}(t)$ which triggers the initial release phase

BG VAD output: $p(VAD)_{filtered}(t)$ which indicates the detection of speech on the background signal Preceding Output Gain Level $g_{out}(t-1)$ which triggers the sub-state Regardless whether the Release is in the Standard or the VAD category, once the Release sub-state Threshold $RTh_{st}$ is reached, the Release sub-state $R_{st}$ is completed. Then, the Release sub-state $R_{st+1}$ begins and is applied until Release sub-state Threshold $RTh_{st+1}$ is reached. This sequence is iterated st−1 times until the complete Release state is completed.

In the following, general concepts of the Standard Release sub-state according to embodiments are described.

If the background VAD output is below the background VAD Threshold VADthr(st), the first Release sub-state to be triggered is the Standard Release sub-state and $$\alpha_{release} = \alpha_{STA(st)}.$$

This means that no significant human speech is detected in the background signal and that the first release sub-state $R_{st}$ to be triggered is a Standard Release sub-state. This Standard Release sub-state st is then followed by Standard Release sub-state st+1.

Once the corresponding Standard Release Threshold STAthr(st) is reached, the next Standard Release sub-state $R_{st+1}$ is triggered.

STAthr(st) is a variable calculated as a function of Clearance with $$STAthr(st) = -0.7 \cdot \text{Clearance [dB]}$$

VAD Release sub-state If the background VAD confidence value is above the background VAD threshold VADthr (st), this indicates that the algorithm detects significant human speech in the background signal. Consequently the VAD Release sub-states are used in the gain processing and $$\alpha_{release} = \alpha_{VAD(st)}.$$

The VAD Release sub-state is typically set to a faster time than the Standard Release sub-state time as this allows the human speech comprised in the background signal to be better audible by the listener.

Once the corresponding VAD Release Threshold VADthr (st) is reached, the next VAD Release sub-state $R_{st+1}$ is triggered.

VADthr(st) is a variable calculated as a function of Clearance with $$VADthr(st) = -0.4 \cdot \text{Clearance [dB]}$$

The solution described in above with respect to Multi-speed Release Smoothing can provide esthetically more pleasing sound mixes than existing technical solutions based on fixed setting. This is because multiple concurrent leveling quality requirements can be fulfilled by the same ABAGS processor which supports adaptive setting.

In the following, VoV Dynamic Clearance is described.

In an embodiment, to attenuate the background signal or to increase an attenuation of the background signal, the gain sequence generator 120 may, e.g., be configured to determine the target gain value depending on an input gain of the sequence of input gains and depending on a presence of speech in the background signal.

According to an embodiment, the gain sequence generator 120 may, e.g., be configured to determine that the target gain value is a first value, which depends on said input gain, if the signal characteristics information indicates that the background signal comprises speech or that a confidence value indicating a probability that the background signal comprises speech is greater than a threshold value. Furthermore, the gain sequence generator 120 may, e.g., be configured to determine that the target gain value is a second value, which depends on said input gain, the second value being different from the first value, if the signal characteristics information indicates that the background signal does not comprise speech or that a confidence value indicating the probability that the background signal comprises speech is smaller than or equal to a threshold value. Applying the target gain value with the first value on the background signal attenuates the background signal more compared to applying the target gain value with the second value on the background signal.

Such an embodiment, e.g., may relate to a situation, where speech in the background signal is particularly disturbing for the foreground signal. This embodiment is based on the finding that even when a speech background signal and a non-speech background signal have same levels, the background signal comprising speech causes more subjective disturbance for the audibility of the foreground signal, in particular, for the audibility of speech that may, e.g., be present in the foreground signal.

In an embodiment, the gain sequence generator 120 may, e.g., be configured to determine a duration of a transition hold period that starts after the transition period in which the gain sequence generator 120 has determined the plurality of succeeding gains by gradually changing the current gain value to the target gain value. The gain sequence generator 120 may, e.g., be configured to determine a duration of a transition hold period depending on the confidence value that indicates the probability for the presence of speech in the background signal, such that a greater confidence value results in a longer duration of the transition hold period compared to a transition hold period resulting from a smaller confidence value. During the transition hold period, the gain sequence generator 120 may, e.g., be configured to not modify a current gain value of a current output gain of the sequence of output gains to reduce the attenuation of the background signal.

At first, Voice Activity Detection (VAD) is described.

It outputs a probability for the presence of human voice in the background signal. This probability has a high variance over time so a lowpass filter filters it first.

Now, adaptive clearance is described.

An additional Clearance parameter, called VoV Clearance, is used for allowing ABAGS to apply additional attenuation to Voice-over-Voice mixing.

VOV Clearance is the minimum level difference to be achieved between foreground and background when speech is detected on the background signal.

The speech detection applied to the background signal produces a confidence value, ranging from 0 to 1. The gain difference between VoV Clearance and Clearance is added to the main Gain proportionally to the confidence value.

The Applied Clearance is calculated with:

$$\text{Applied\_Clearance}(t) = \text{Clearance} + (\text{Voice\_over\_Voice\_Clearance} - \text{Clearance}) \cdot p(VAD)_{filtered}(t)$$

Now, background VAD Hold is described.

An additional Hold time is inserted between attack and release and depending on the presence of speech in the background signal. This hold time is called background VAD Hold and is calculated with $$\text{BG\_VAD\_Hold}(t) = \text{Hold\_Time} \cdot p(VAD)_{filtered}(t)\ [\text{ms}]$$

Straight before a Release step is triggered, the algorithm calculates the background VAD Hold time and performs the hold. This additional hold time is retained as a counter-value which counts up during the background VAD Hold and is reset directly after the next attack.

In the following, smoothing consistency (Attack Gain Threshold and Hold Ratio Threshold) is described.

In an embodiment, the signal characteristics provider 110 may, e.g., be configured to determine depending on the signal characteristics information, whether or not the current gain value of the current gain of the sequence of output gains shall be modified.

According to an embodiment, the signal characteristics provider 110 may, e.g., be configured to conduct a threshold test using a current input gain value of a current input gain of the sequence of input gains for the threshold test. The threshold test may, e.g., comprise determining whether or not the current input gain value is smaller than a threshold, or the threshold test may, e.g., comprise determining whether or not the current input gain value is smaller than or equal to the threshold. Moreover, the threshold is defined depending on a desired target value and a tolerance value. The signal characteristics provider 110 may, e.g., be configured to determine, depending on the threshold test, whether or not the current gain value of the current gain of the sequence of output gains shall be modified. The signal characteristics provider 110 may, e.g., be configured to determine that the current gain value of the current gain of the sequence of output gains shall be modified, if the current input gain value is smaller than the desired target gain minus the tolerance value. Or, the signal characteristics provider 110 may, e.g., be configured to determine that the current gain value of the current gain of the sequence of output gains shall be modified, if the current input gain value is greater than the desired target gain plus the tolerance value.

In such an embodiment, the tolerance value included in the threshold test realizes that small deviations in the input gain values do not cause the initiation of an attack phase. This reduces the number of initiated attack phase and keeps the ducking level constant, in case only minor deviations regarding the input gain values occur.

According to an embodiment, wherein, if during the transition period, in which the gain sequence generator 120 gradually changes the current gain value to the target gain value, the target gain value is not reached yet, and if the current input gain value is equal to the target gain value or deviates by less than a tolerance value defined by a relative hold threshold from the target gain value, the gain sequence generator 120 may, e.g., be configured to continue the transition period. In such an embodiment, if the current input gain value deviates by the tolerance value or by more than the tolerance value from the target gain value, the gain sequence generator 120 may, e.g., be configured to determine a plurality of first next gains of the sequence of output gains having a same gain value for each gain of the plurality of first next gains; and the gain sequence generator 120 may, e.g., be configured to determine a plurality of second next gains of the sequence of output gains, which succeed the plurality of first next gains in the sequence of output gains, such that any gain value of the plurality of second next gains being applied on the background signal results in a smaller attenuation of the background signal, compared to when any gain value of the plurality of first next gains is applied on the background signal.

The consistency feature describes a hysteresis for the gain smoothing. Attack Hysteresis Threshold is the hysteresis to ensure that a (consecutive) attack-phase of the smoothing is only triggered when the target gain falls below the current gain minus the Attack Hysteresis Threshold value. In other words, small variations in the gain are ignored and only significant ducking (compared to the current value) is considered as meaningful for triggering the attack-phase of the smoothing. This feature reduces the number of erroneous attacks and improves the ducking result in terms of stability. In a advantageous embodiment, the Attack Hysteresis Threshold is defined in absolute units of dB.

In an embodiment, complementary to Attack Hysteresis Threshold, a Hold Ratio Threshold is used for hysteresis. It ensures that a (consecutive) release-phase is only triggered when the target gain increases by more than a certain percentage with respect to the current gain.

This feature reduces the number of releases to a very appropriate number as it keeps the ducking level constant when the foreground speech gets softer, or during the appearance of softer phonemes and short speech pauses.

In a particular embodiment, the hold phase is only triggered, and the attack phase continues, until the current input gain increases by more than a certain percentage with respect to the target gain, and thus, as long as the attack phase continues, because, the hold phase is not reached, a consecutive release phase will also not be triggered.

In a advantageous embodiment, a Hold Ratio Threshold is defined as a ratio of the current target gain, opposed to the absolute values used for Attack Gain Threshold.

The Attack Gain Threshold is calculated with $$\text{Attack\_Gain\_Threshold} = g_{target}(t) - \text{Attack\_Threshold}\ [\text{dB}]$$

The Relative Hold Threshold is calculated with $$\text{Relative\_Hold\_Threshold} = g_{target}(t)(1 - \text{Hold\_Ratio\_Threshold})\ [\text{dB}]$$

whereas the relative hold threshold value is the percentage value at which a hold is triggered.

In the following, reference is briefly made to the Hold states and Idle state.

In both, Hold states and the Idle state, the earlier smoothed output gain value is kept (target gain), regardless what the input raw gain value is, i.e., $$\alpha_{hold} = \alpha_{idle} = 0.$$

In the following, further advantages and application fields of some of the embodiments are summarized.

Embodiments allow reducing the processing look-ahead, both in the level estimation and in the smoothing of the first gain curve, such that the method can be deployed in real-time applications in broadcast and audio production.

Some of the provided embodiments are content agnostic, realize an adaptive processing, low latency and a smooth gain curve. Many tuning possibilities for the algorithm due to the high amount of parameters may, e.g., exist.

In some embodiments, easy adjustment by using macro parameters is possible.

Technical applications of some of the embodiments are AMAU (Audio Monitoring and Authoring Unit), Audio Processor, real-time and file-based.

Some of the embodiments are integrated into a DAW (Digital Audio Workstation). The ABAGS algorithm can be used for live audio playback from the DAW.

Further embodiments may, e.g., be integrated into an audio plugin for DAW.

Other embodiments may, e.g., be integrated into a real-time hardware processor for ducking scenarios or in the scope of next generation audio authoring (e.g., MPEG-H).

Calculated gains of embodiments may, e.g., be applied directly to the background signal and then mixed with the foreground signal.

In embodiments, the gains can be transmitted as metadata together with the foreground and background audio signals. The gain is applied in the mixing process in the receiver/decoder.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J.-M. Jot, B. Smith and J. Thompson, "Dialog Control and Enhancement in Object-Based Audio Systems," in AES 143rd Convention, New York, 2015.

[2] M. Torcoli, A. Freke-Morin, J. Paulus, C. Simon and B. Shirley, "Background Ducking to Produce Esthetically Pleasing Audio for TV with Clear Speech," in Proceedings of the 146th AES Convention, Dublin, Ireland, 2019.

[3] G. R. Groves, "Sound Recording". U.S. Pat. No. 2,113, 834, 12 Apr. 1938.

[4] EBU, R128-Loudness normalisation and permitted maximum level of audio signals, 2014.

[5] International Telecommunication Union, "ITU-R BS.1770-3: Algorithms to measure audio programme loudness and true-peak audio level," Geneva, 2015.

The invention claimed is:

1. Apparatus for providing a sequence of output gains, wherein the sequence of output gains is suitable for attenuating a background signal of an audio signal, wherein the apparatus comprises:

a signal characteristics provider configured to receive or to determine signal characteristics information on one or more characteristics of the audio signal, wherein the signal characteristics information depends on the background signal, wherein the signal characteristics information comprises a sequence of input gains which depends on the background signal and on a foreground signal of the audio signal; and a gain sequence generator configured to determine the sequence of output gains depending on the sequence of input gains; and wherein the apparatus is configured to amplify or attenuate a background signal by applying the sequence of output gains on the background signal to acquire a processed background signal;

wherein, to determine the sequence of outputs gains, to modify a current gain value of a current gain of the sequence of output gains to a target gain value, the gain sequence generator is configured to determine a plurality of succeeding gains, which succeed the current gain in the sequence of output gains, by gradually changing the current gain value according to a modification rule during a transition period to the target gain value, wherein the modification rule depends on the signal characteristics information; and/or wherein the gain sequence generator is configured to determine the target gain value depending on a further one of the one or more characteristics of the audio signal in addition to the sequence of input gains.

2. Apparatus according to claim 1, wherein, to attenuate the background signal or to increase an attenuation of the background signal, the gain sequence generator is configured to determine the plurality of succeeding gains, which succeed the current gain, by gradually changing the current gain value according to the modification rule during the transition period to the target gain value, such that a duration of the transition period depends on the signal characteristics information.

3. Apparatus according to claim 1, wherein a smaller first input gain value of a sequence of input gains results in a shorter first duration of the transition period compared to a second duration of the transition period when a second input gain value of the sequence of input gains is greater, if the smaller first input gain value indicates a greater disturbance of the foreground signal by the background signal than the second input gain value, or wherein a smaller first input gain value of a sequence of input gains results in a longer first duration of the transition period compared to a second duration of the transition period when the second input gain value of a sequence of input gains is greater, if the smaller first input gain value indicates a smaller disturbance of the foreground signal by the background signal than the second input gain value.

4. Apparatus according to claim 1, wherein, to reduce an attenuation of the background signal, the gain sequence generator is configured to select, depending on the signal characteristics information, a modification rule candidate out of two or more modification rule candidates as the modification rule;

wherein selecting a first one of the two or more modification rule candidates by the gain sequence generator results in a shorter first duration of the transition period, during which the current gain value is gradually changed by the gain sequence generator to the target gain value, compared to a second duration of the transition period, when a second one of the two or more modification rules is selected by the gain sequence generator.

5. Apparatus according to claim 4, wherein the gain sequence generator is configured to select the first one of the two or more modification rule candidates, if the signal characteristics information indicates that a current portion of the background signal comprises speech, or if the signal characteristics information comprises a confidence value for a probability that the background signal comprises speech, which is higher than a speech threshold value; and the gain sequence generator is configured to select the second one of the two or more modification rule candidates, if the signal characteristics information indicates that the current portion of the background signal does not comprise speech, or if the confidence value is lower than or equal to the speech threshold value.

6. Apparatus according to claim 4, wherein each of the two or more modification rule candidates defines at least two sub-modification rules, wherein a first one of the at least two sub-modification rules is applied during a first sub-period of the transition period, wherein a second one of the at least two sub-modification rules is applied during a second sub-period of the transition period, wherein the second sub-period succeeds the first sub-period in time, and wherein the first one of the at least two sub-modification rules defines a faster adaptation towards the target gain value from one of the plurality of succeeding gains to its immediate successor compared to the second one of the at least two sub-modification rules.

7. Apparatus according to claim 1, wherein, to attenuate the background signal or to increase an attenuation of the background signal, the gain sequence generator is configured to determine the target gain value depending on an input gain of the sequence of input gains and depending on a presence of speech in the background signal.

8. Apparatus according to claim 7, wherein the gain sequence generator is configured to determine that the target gain value is a first value, which depends on said input gain, if the signal characteristics information indicates that the background signal comprises speech or that a confidence value indicating a probability that the background signal comprises speech is greater than a threshold value, wherein the gain sequence generator is configured to determine that the target gain value is a second value, which depends on said input gain, the second value being different from the first value, if the signal characteristics information indicates that the background signal does not comprise speech or that a confidence value indicating the probability that the background signal comprises speech is smaller than or equal to a threshold value, wherein applying the target gain value with the first value on the background signal attenuates the background signal more compared to applying the target gain value with the second value on the background signal.

9. Apparatus according to claim 1, wherein the signal characteristics provider is configured to determine depending on the signal characteristics information, whether or not the current gain value of the current gain of the sequence of output gains shall be modified.

10. Apparatus according to claim 9, wherein the signal characteristics provider is configured to conduct a threshold test using a current input gain value of a current input gain of the sequence of input gains for the threshold test, wherein the threshold test comprises determining whether or not the current input gain value is smaller than a threshold, or the threshold test comprises determining whether or not the current input gain value is smaller than or equal to the threshold.

11. Apparatus according to claim 10, wherein the threshold is defined depending on a desired target value and a tolerance value, wherein the signal characteristics provider is configured to determine, depending on the threshold test, whether or not the current gain value of the current gain of the sequence of output gains shall be modified, and wherein the signal characteristics provider is configured to determine that the current gain value of the current gain of the sequence of output gains shall be modified, if the current input gain value is smaller than the desired target gain minus the tolerance value, or wherein the signal characteristics provider is configured to determine that the current gain value of the current gain of the sequence of output gains shall be modified, if the current input gain value is greater than the desired target gain plus the tolerance value.

12. Apparatus according to claim 1, wherein the foreground signal and background signal are encoded within a sequence of audio frames, and/or wherein the audio signal is encoded within the sequence of audio frames, wherein the sequence of output gains to be determined by the gain sequence generator is a current sequence of output gains being associated with a current frame of the sequence of audio frames, and wherein, for determining the current sequence of output gains, the gain sequence generator is configured to use information being encoded within a current frame of the sequence of audio frames, without using information encoded in a succeeding frame of the sequence of audio frames, which succeeds the current audio frame in time.

13. Apparatus according to claim 1, wherein the gain sequence generator is configured to determine an adaptive attack time, such that a duration of the transition period during which the gain sequence generator is configured to determine the plurality of succeeding gains, which succeed the current gain, by gradually changing the current gain value, depends on the adaptive attack time, wherein the gain sequence generator is configured to determine the plurality of succeeding gains, which succeed the current gain, depending on the adaptive attack time.

14. Apparatus according to claim 13, wherein the gain sequence generator is configured to determine the adaptive attack time depending on an input gain value of one of the input gains of the sequence of input gains, or indicates an average of a plurality of input gain values of a plurality of input gains of the sequence of input gains, being stored within a current input gain buffer of the apparatus.

15. Apparatus according to claim 14, wherein the signal characteristics provider is configured to determine the adaptive attack time depending on:

$$AAT(t) = \min\left(AAT(t-1),\ \max\left(minAT,\ \left(maxAT - M \cdot \frac{maxAT \cdot g_{mean}(t)}{maxGain}\right)\right)\right)$$

wherein AAT is the adaptive Attack Time, wherein minAT is the predefined minimum attack time, wherein maxAT is the predefined maximum attack time, wherein AAT(t−1) is set to maxAT, if it is allowed to reset the Adaptive Attack Time value, otherwise the previous value of AAT is used, $g_{mean}(t)$ indicates said input gain value of said one of the input gains of the sequence of input gains, or indicates the average of said plurality of input gain values of said plurality of input gains of the sequence of input gains, being stored within the current input gain buffer of the apparatus, M is a coefficient with $0<M<1$, and wherein maxGain depends on the predefined minimum applicable $g_{out}$ value, or wherein maxGain depends on the predefined maximum applicable $g_{out}$ value.

16. Apparatus according to claim 13, wherein the gain sequence generator is configured to use the adaptive attack time to determine a smoothing coefficient, which defines for the transition period a degree of adaptation towards the target gain value from one of the plurality of succeeding gains to its immediate successor, wherein the gain sequence generator is configured to determine the plurality of succeeding gains, which succeed the current gain, depending on the smoothing coefficient.

17. Apparatus according to claim 13, wherein the gain sequence generator is configured to determine the plurality of succeeding gains, which succeed the current gain, by iteratively applying the smoothing coefficient on the target gain value and on a previously determined one of the plurality of succeeding gains.

18. Apparatus according to claim 17, wherein the gain sequence generator is configured to determine the plurality succeeding gains, which succeed the current gain, by iteratively applying $$g_{out}(t) = (1 - \alpha(t))g_{out}(t-1) + \alpha(t)g_{target}(t),$$

wherein $g_{out}(t)$ is the output gain value at time instant t, $g_{out}(t-1)$ is the output gain value at time instant (t−1), $g_{target}(t)$ is the target gain value at time instant t, $\alpha(t)$ is the smoothing coefficient, t is a time instant.

19. Apparatus according to claim 1, wherein the gain sequence generator is configured to determine a duration of a transition hold period that starts after the transition period in which the gain sequence generator has determined the plurality of succeeding gains by gradually changing the current gain value to the target gain value, wherein the gain sequence generator is configured to determine a duration of a transition hold period depending on a confidence value that indicates the probability for the presence of speech in the background signal, such that a greater confidence value results in a longer duration of the transition hold period compared to a transition hold period resulting from a smaller confidence value, wherein during the transition hold period, the gain sequence generator is configured to not modify a current gain value of a current output gain of the sequence of output gains to reduce the attenuation of the background signal.

20. Apparatus according to claim 1, wherein, if during the transition period, in which the gain sequence generator gradually changes the current gain value to the target gain value, the target gain value is not reached yet, and if the current input gain value is equal to the target gain value or deviates by less than a tolerance value defined by a relative hold threshold from the target gain value, the gain sequence generator is configured to continue the transition period, and wherein, if the current input gain value deviates by the tolerance value or by more than the tolerance value from the target gain value, the gain sequence generator is configured to determine a plurality of first next gains of the sequence of output gains with a same gain value for each gain of the plurality of first next gains; and the gain sequence generator is configured to determine a plurality of second next gains of the sequence of output gains, which succeed the plurality of first next gains in the sequence of output gains, such that any gain value of the plurality of second next gains being applied on the background signal results in a smaller attenuation of the background signal, compared to when any gain value of the plurality of first next gains is applied on the background signal.

21. Apparatus according to claim 1, wherein the gain sequence generator is configured to determine the sequence of output gains in a logarithmic domain, such that the sequence of output gains is suitable for being subtracted from or added to a level of the background signal, or wherein the gain sequence generator is configured to determine the sequence of output gains in a linear domain, such that the sequence of output gains is suitable for dividing the plurality of samples of the background signal by the sequence of output gains, or such that the sequence of output gains is suitable for being multiplied with the plurality of samples of the background signal.

22. System for generating an audio output signal, wherein the system comprises:

an apparatus according to claim 1, and an audio mixer for generating the audio output signal, wherein the audio mixer is configured to receive the sequence of output gains from the apparatus according to claim 1, wherein the audio mixer is configured to amplify or attenuate a background signal by applying the sequence of output gains on the background signal to acquire a processed background signal, and wherein the audio mixer is configured to mix a foreground signal and the processed background signal to acquire the audio output signal.

23. System according to claim 22, wherein the plurality of output gains is represented in a logarithmic domain, and the audio mixer is configured to subtract the plurality of output gains or a plurality of derived samples, being derived from the plurality of output gains, from a level of the background signal to acquire the processed background signal, or wherein the plurality of output gains is represented in the logarithmic domain, and the audio mixer is configured to add the plurality of output gains or the plurality of derived samples to the level of the background signal to acquire the processed background signal, or wherein the plurality of output gains is represented in a linear domain, and the audio mixer is configured to divide the plurality of samples of the background signal by the plurality of output gains or by the plurality of derived samples to acquire the processed background signal, or wherein the plurality of output gains is represented in the linear domain, and the audio mixer is configured to multiply the plurality of output gains or the plurality of derived samples with the plurality of samples of the background signal to acquire the processed background signal.

24. System according to claim 22, wherein the system further comprises a gain computation module, wherein the gain computation module is configured to calculate a sequence of input gains depending on the foreground signal and on the background signal, and is configured to feed the sequence of input gains into the apparatus.

25. System according to claim 24, wherein the system comprises a decomposer, wherein the decomposer is configured to decompose an audio input signal into the foreground signal and into the background signal, and wherein the decomposer is configured to feed the foreground signal and the background signal into the gain computation module and into the mixer.

26. Method for providing a sequence of output gains, wherein the sequence of output gains is suitable for attenuating a background signal of an audio signal, wherein the method comprises:

receiving or determining signal characteristics information on one or more characteristics of the audio signal, wherein the signal characteristics information depends on the background signal, wherein the signal characteristics information comprises a sequence of input gains which depends on the background signal and on a foreground signal of the audio signal;

determining the sequence of output gains depending on the sequence of input gains; and amplifying or attenuating a background signal by applying the sequence of output gains on the background signal to acquire a processed background signal;

wherein, to determine the sequence of outputs gains, modifying a current gain value of a current gain of the sequence of output gains to a target gain value is conducted, such that a plurality of succeeding gains, which succeed the current gain in the sequence of output gains, is determined by gradually changing the current gain value according to a modification rule during a transition period to the target gain value, wherein the modification rule depends on the signal characteristics information; and/or wherein the target gain value is determined depending on a further one of the one or more characteristics of the audio signal in addition to the sequence of input gains.

27. Non-transitory digital storage medium having a computer program stored thereon to perform the method for providing a sequence of output gains, wherein the sequence of output gains is suitable for attenuating a background signal of an audio signal, wherein the method comprises:

receiving or determining signal characteristics information on one or more characteristics of the audio signal, wherein the signal characteristics information depends on the background signal, wherein the signal characteristics information comprises a sequence of input gains which depends on the background signal and on a foreground signal of the audio signal; and determining the sequence of output gains depending on the sequence of input gains; and amplifying or attenuating a background signal by applying the sequence of output gains on the background signal to acquire a processed background signal;

wherein, to determine the sequence of outputs gains, modifying a current gain value of a current gain of the sequence of output gains to a target gain value is conducted, such that a plurality of succeeding gains, which succeed the current gain in the sequence of output gains, is determined by gradually changing the current gain value according to a modification rule during a transition period to the target gain value, wherein the modification rule depends on the signal characteristics information; and/or wherein the target gain value is determined depending on a further one of the one or more signal characteristics in addition to the sequence of input gains, when said computer program is run by a computer.

* * * * *